United States Patent
Bailey et al.

(10) Patent No.: US 10,125,228 B2
(45) Date of Patent: Nov. 13, 2018

(54) PHOTOTUNABLE THERMOPLASTIC ELASTOMER HYDROGEL NETWORKS

(71) Applicant: Colorado State University Research Foundation, Fort Collins, CO (US)

(72) Inventors: Travis S. Bailey, Fort Collins, CO (US); Nabila Asem Huq, Fort Collins, CO (US); Vincent F. Scalfani, Northport, AL (US); John R. Ekblad, Fort Collins, CO (US); Alexander T. Leonard, Flagstaff, AZ (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 15/612,463

(22) Filed: Jun. 2, 2017

(65) Prior Publication Data

US 2018/0051139 A1 Feb. 22, 2018

Related U.S. Application Data

(60) Provisional application No. 62/377,822, filed on Aug. 22, 2016.

(51) Int. Cl.
| | |
|---|---|
| *C08F 2/46* | (2006.01) |
| *C08F 2/50* | (2006.01) |
| *C08G 61/04* | (2006.01) |
| *C08J 3/075* | (2006.01) |
| *C08J 3/09* | (2006.01) |
| *C08J 3/28* | (2006.01) |
| *C08L 53/00* | (2006.01) |

(52) U.S. Cl.
CPC ............. *C08J 3/075* (2013.01); *C08J 3/095* (2013.01); *C08J 3/28* (2013.01); *C08L 53/005* (2013.01); *C08J 2353/00* (2013.01)

(58) Field of Classification Search
CPC ........ C08J 3/075; C08J 2353/00; C08J 3/095; C08J 3/28; C08L 53/005
USPC ................................ 522/166, 162, 1; 520/1
See application file for complete search history.

(56) References Cited

U.S. PATENT DOCUMENTS

| | | |
|---|---|---|
| 2002/0159982 A1 | 10/2002 | Bonassar et al. |
| 2003/0232895 A1 | 12/2003 | Omidian et al. |
| 2003/0236513 A1 | 12/2003 | Schwarz et al. |
| 2004/0101518 A1 | 5/2004 | Vacanti et al. |
| 2008/0191200 A1 | 8/2008 | Frisbie et al. |
| 2010/0221614 A1 | 9/2010 | Bertin et al. |
| 2011/0104452 A1 | 5/2011 | Grozea et al. |
| 2015/0110772 A1* | 4/2015 | Scherman ............... C08J 3/075 424/94.61 |

FOREIGN PATENT DOCUMENTS

| | | | |
|---|---|---|---|
| WO | WO 2015/038577 A1 | 3/2015 | |
| WO | WO-2015038577 A1 * | 3/2015 | .............. C08L 43/04 |

OTHER PUBLICATIONS

Guo et al, Tailoring mechanical response through coronal layer overlap in tethered micelle hydrogel networks, Aug. 14, 2015, Soft Matter, 11, 7345-7355 (Year: 2015).*
Guo C, Bailey TS. Highly distensible nanostructured elastic hydrogels from AB diblock and ABA triblock copolymer melt blends. Soft Matter. 2010; vol. 6, pp. 4807-4818.
Guo C, Bailey TS. Tailoring mechanical response through coronal layer overlap in tethered micelle hydrogel networks. Soft Matter. Aug. 14, 2015; vol. 11, pp. 7345-7355.
International Search Report and Written Opinion, PCT/US2016/064921, dated Feb. 21, 2017.
International Search Report and Written Opinion, PCT/US2016/064956, dated Feb. 21, 2017.
International Search Report and Written Opinion, PCT/US2017/035705, dated Sep. 1, 2017.

* cited by examiner

*Primary Examiner* — Jessica Whiteley
(74) *Attorney, Agent, or Firm* — Polsinelli PC

(57) ABSTRACT

Provided herein is a thermoplastic elastomer hydrogel and methods of making such. The hydrogel comprises a glass formed from poly(styrene)-b-poly(ethylene oxide) in which the coronal chain end has been functionalized with photodimerizable groups (AB-photo) and a liquid medium at a concentration between about 32:1 and about 2:1 liquid medium/AB-photo by weight. The hydrogel has a fatigue resistance to at least 500,000 compression cycles.

23 Claims, 23 Drawing Sheets

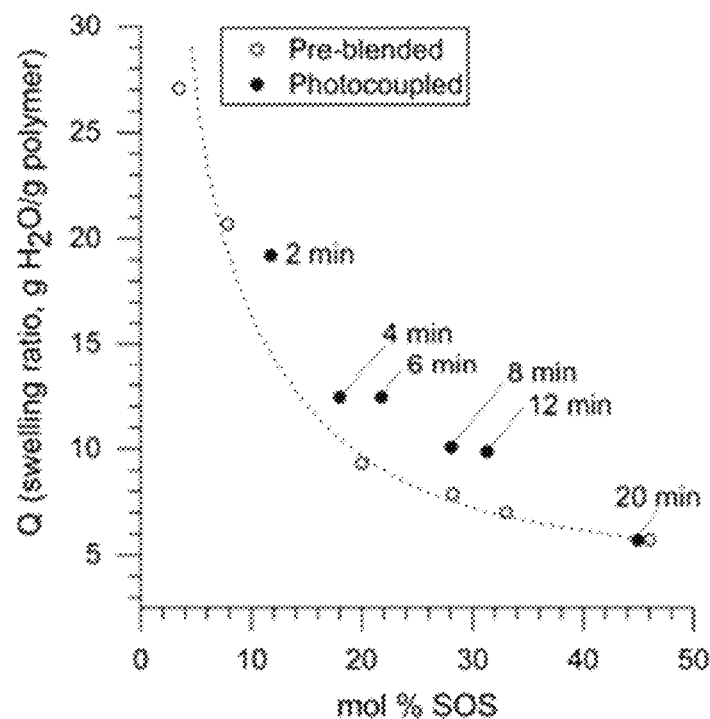
FIG. 4A
FIG. 4B
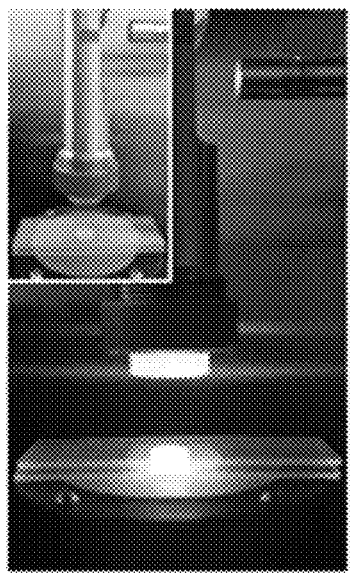
FIG. 4C
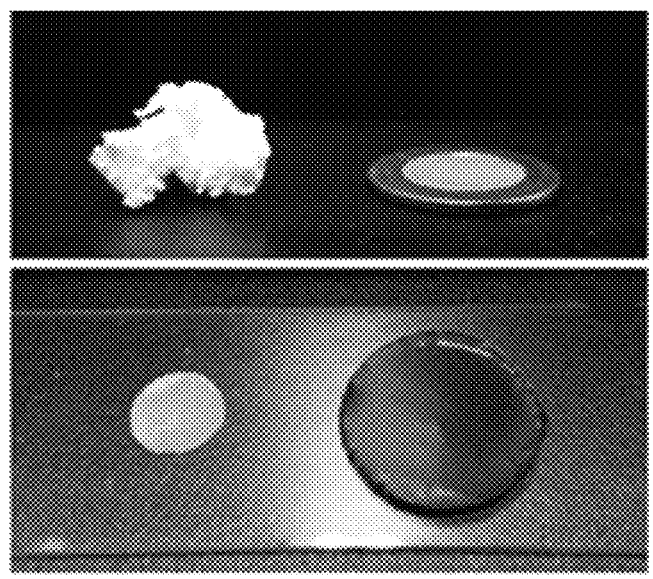
FIG. 4D

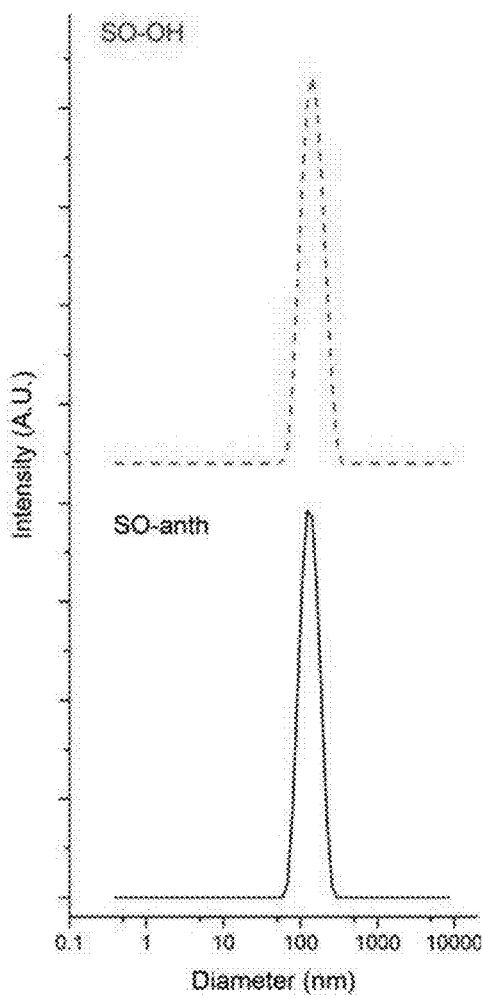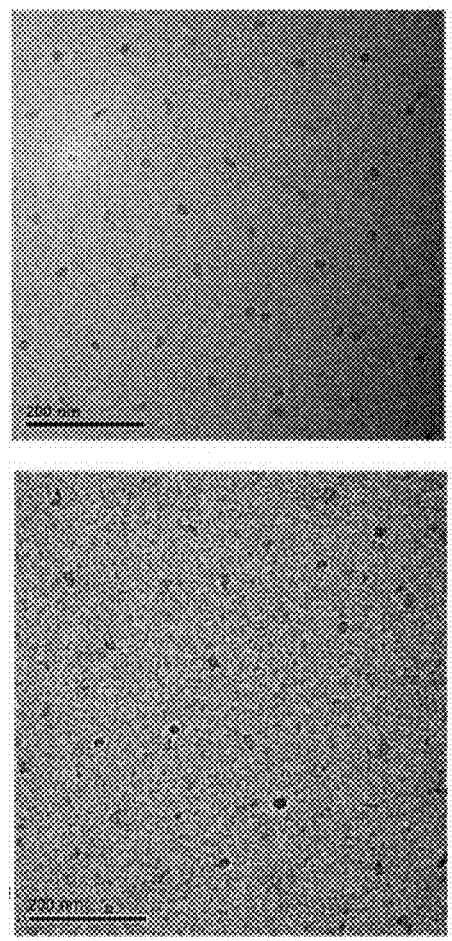
FIG. 19B
FIG. 19A
FIG. 19C

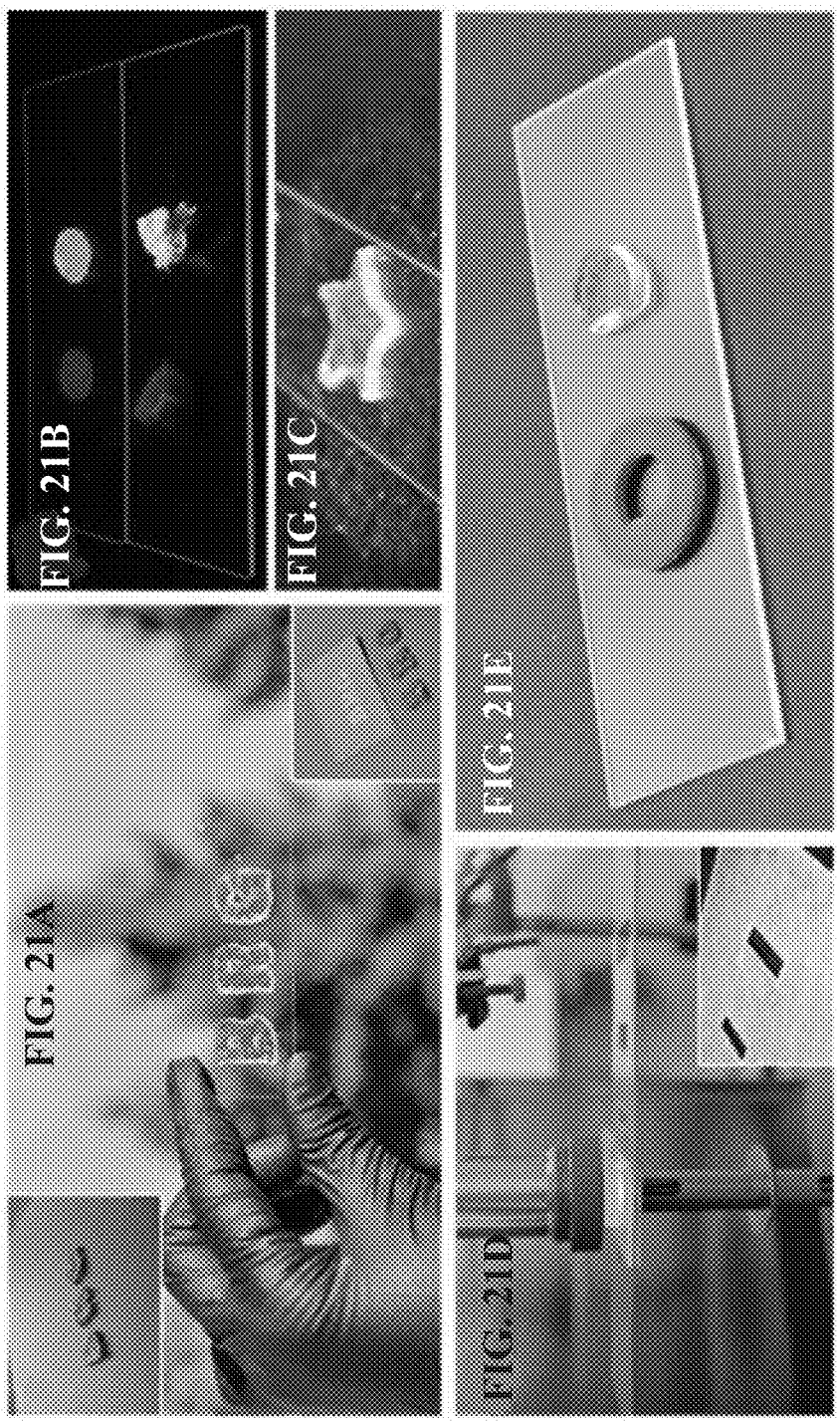

PHOTOTUNABLE THERMOPLASTIC ELASTOMER HYDROGEL NETWORKS

CROSS REFERENCE TO RELATED APPLICATIONS

This application claims the benefit of U.S. Provisional Application No. 62/377,822 entitled "Phototunable Thermoplastic Elastomer Hydrogel Networks," filed Aug. 22, 2016, the disclosures of which are hereby incorporated by reference in its entirety.

GOVERNMENTAL RIGHTS

This invention was made with government support under Grants CBET-1160026, DMR-0645781, DMR-0821799 awarded by the National Science Foundation. The government has certain rights in the invention.

FIELD OF THE INVENTION

Aspects of the present disclosure relate to copolymer blends. More specifically, the present disclosure relates to thermoplastic elastomer hydrogels, which have a high water content while maintaining superior fatigue resistance and modulus recovery.

BACKGROUND OF THE INVENTION

Hydrogel networks are of broad scientific interest due to their utility and compatibility in a variety of applications including tissue scaffolds, encapsulation matrices, delivery agents, and separation membranes. Numerous methods to produce hydrogel networks have been reported, generally exploiting physical or chemical cross-linking of hydrophilic polymers and monomers in solution. However, conventional systems like these based on spatially random or statistical crosslinking mechanisms can suffer from weakly-defined network structures with a large distribution of mesh sizes arising from the random nature of the cross-linking process. Heterogeneity in structure and mesh size across the sample profile can result in spatial inconsistencies in mechanical properties, swelling, and mass transport within the hydrogel. As such, there is a long-felt, but unmet need for hydrogel systems that do not exhibit heterogeneity in the structure and mesh size within the hydrogel.

SUMMARY OF THE INVENTION

Provided herein is a method for preparing a block copolymer hydrogel. The method may comprise heating a dry blend of poly(styrene)-b-poly(ethylene oxide) diblock copolymer in which the coronal chain end has been functionalized with photo-dimerizable anthracene groups (SO-anth) to form an SO-anth melt; exposing the SO-anth melt to ultraviolet light (UV light); and contacting the UV exposed SO-anth melt with a liquid medium to form a block copolymer hydrogel. In some aspects, the method may further comprising allowing the SO-anth melt to attain ambient temperature before contacting with liquid medium. In further aspects, the dry blend is heated to 150° C. and then cooled to a temperature of about 70° C. to about 100° C.

The SO-anth melt may be exposed to UV light from about 1 to about 25 minutes. The UV light may have a wavelength of about 320-380 nm. In some aspects, the UV wavelength is 365 nm.

Also provided herein, is a method for preparing a block copolymer hydrogel that comprises heating a dry blend of poly(styrene)-b-poly(ethylene oxide) diblock copolymer in which the coronal chain end has been functionalized with photo-dimerizable anthracene groups (SO-anth) to form an SO-anth melt and allowing the SO-anth melt to attain ambient temperature to form an SO-anth glass. A liquid medium is then added to the SO-anth diblock glass to form a SO-anth diblock solution; and the SO-anth diblock solution is exposed to UV light. The method may further comprise contacting the SO-anth diblock solution with the liquid medium after exposure to UV light. In some aspects the method may further comprise contacting the SO-anth diblock solution with a second liquid medium after exposure to UV light. In other aspects, the SO-anth diblock solution may be injected or placed in a mold.

The SO-anth diblock solution may be exposed to UV light from about 1 to about 25 minutes. The SO-anth diblock solution may be exposed to UV light having a wavelength of about 320-380 nm. In some aspects, the UV wavelength is 365 nm.

In some aspects, the polystyrene of the poly(styrene)-b-poly(ethylene oxide) diblock copolymer utilized in the methods disclosed herein may be fully or partially hydrogenated. In some aspects, the methods may further include fully or partially hydrogenating the polystyrene.

In some aspects, the liquid medium used for methods disclosed herein is selected from an aqueous medium, a room-temperature ionic liquid (RTIL), a dialkylcarbonate, an alkylenecarbonate, or combinations thereof. In some aspects, the liquid medium may be water. The block copolymer hydrogel produced from the methods disclosed herein may have a liquid medium concentration between about 32:1 and 2:1 liquid medium/SO-anth by weight. The block copolymer hydrogel may have a liquid medium concentration between about 16:1 and about 4:1 liquid medium/SO-anth by weight.

In further aspects, block copolymer hydrogel resulting from the methods disclosed herein may have a fatigue resistance to at least 500,000 compression cycles. The compression cycles may operate with at least 12% compression at a frequency of about 1 Hz. The compression cycles may operate with at least 50% compression at least every eleventh cycle. In other aspects, the fatigue resistance may be characterized by a modulus recoverable to at least 80% of its value before the compression cycles were run. In further aspects, the fatigue resistance is characterized by a modulus recoverable to at least 92% of its value before the compression cycles were run.

Additionally provided herein is a block copolymer hydrogel solution, comprising a dry blend comprising poly(styrene)-b-poly(ethylene oxide) diblock copolymer in which the coronal chain end has been functionalized with photo-dimerizable anthracene groups (SO-anth) and a liquid medium at a concentration between about 32:1 and about 2:1 liquid medium/SO-anth by weight. In some aspects, the block copolymer hydrogel solution may be exposed to UV light. In further aspects, the hydrogel solution may have a liquid medium concentration between about 16:1 and about 4:1 liquid medium/SO-anth by weight. The liquid medium maybe selected from an aqueous medium, a room-temperature ionic liquid (RTIL), a dialkylcarbonate, an alkylenecarbonate, or combinations thereof. In some aspects, the liquid medium may be water. In further aspects, the polystyrene of the poly(styrene)-b-poly(ethylene oxide) diblock copolymer may be fully or partially hydrogenated. In some, aspects the block copolymer hydrogel solution may injected/placed into a mold and then exposed to UV light. In some aspects, the UV exposed block copolymer hydrogel solution may have a may have a fatigue resistance to at least 500,000 compression cycles.

BRIEF DESCRIPTION OF THE FIGURES

FIG. 1A depicts SO-anth self-assembly during melt-processing into preformed disks. Those disks are then irradiated with UV light while still in the melt state, inducing chain end photocoupling through anthracene dimerization. Disks are then cooled and swollen in water to form the final hydrogel. FIG. 1B depicts SO-anth self-assembly in the melt to form photoactive micelles of PS cores and PEO coronas. Free photoactive micelles of vitrified PS cores are dispersed in water (before any UV irradiation) to form viscous solutions of known ratios of water to polymer ($Q_{pre-swell}$). These solutions can then be poured or smeared into a mold and UV irradiated to form PS-PEO-PS triblock copolymer tethers in situ. The resulting gel, which is at the same $Q_{pre-swell}$ as before solution molding retains the shape it was cured in. It is then placed in excess water to swell to its equilibrium dimensions and now at $Q_{post-swell}$, remains in the same shape set during irradiation.

FIG. 3A is an overlay of the rheological temperature ramps of SO-OH (SO) and SO-anth while heating at 1° C. min$^{-1}$ with angular frequency of 1 rad s$^{-1}$ and strain of 5%. The steady decrease in moduli and absence of a plateau region is consistent with BCP melts containing a liquid-like packing of domains. FIG. 3B shows azimuthally integrated SAXS data at 100° C. for SO-OH (SO) and SO-anth. Higher order reflections are absent which also characteristic of BCPs having LLP.

FIGS. 4A-4D. FIG. 4A shows swelling ratios of pre-blended SO/SOS and photocoupled SO-anth hydrogels as a function of mol percent triblock copolymer. In both systems, the ratio of swelling (Q) could be controlled with concentration of triblock copolymer. The dashed line serves as a visual reference showing the typical swelling behavior of pre-blended two-component hydrogels. Adjacent images depict aspects of the hydrogel fabrication process. FIG. 4B depicts preformed disks sandwiched between quartz glass slides and heated using a peltier plate (inset). Heated samples were then irradiated with UV light (365 nm). FIG. 4C shows SO-anth as a powder and as a pressed disk following thermal processing using a circular mold. FIG. 4D is an example of a UV irradiated sample before and after swelling in deionized (DI) water with food coloring added for visual contrast in these photographs.

FIG. 5A depicts SEC traces of SO-anth samples that have been photocoupled with 365 nm UV filtered light at 100° C. for 0-20 min. FIG. 5B shows the concentration of photocoupled SOS triblock correlated with UV irradiation time.

FIG. 6A shows 1D azimuthally integrated SAXS data comparing photocoupled SOS 6.6 (1 minute UV exposure) and SOS 11.3 (3 minutes UV exposure) to samples pre-blended to approximately matched SOS concentrations of these photocoupled samples (SOS 5.9 and SOS 10.7). This was done in the melt at 100° C. just prior to vitrification. The primary peak and adjacent broad shoulder are typical scattering signatures for SOS blends exhibiting a liquid-like packing of spheres. FIG. 6B depicts fits of the SOS 5.9, SOS 6.6, SOS 10.7, and SOS 11.3 to a Percus-Yevick hard sphere model for polydisperse spheres which confirm a polystyrene core radius of 10.5 nm, and a principal domain spacing of about 26-27 nm. Such similarity is an intended byproduct of using "lattice matched" SO and SOS block copolymer compositions.

FIG. 15A shows SO-anth chains in the form of a white powder were self-assembled using a heated press to be formed into discs or sheets. Morphology and geometry of SO-anth before and after annealing at 120° C. was confirmed using SAXS annealing (FIG. 15B) and rheological temperature ramps (FIG. 15C). Adoption of BCC structure appears to occur only after extended annealing of the samples.

FIGS. 19A-19C show DLS and CryoTEM images of micelle/water solutions formed from SO-OH and SO-anth.

FIGS. 21A-21E include photographs of polymer solutions. Solutions can be molded to form soft hydrogel shapes with sharp edge distinctions (FIG. 21D and FIG. 21E), and masked to produce specific shapes (FIG. 21A and FIG. 21C). Uncoupled anthracene is shown to fluoresce under UV, with loss of fluorescence upon photo-tethering (FIG. 21B).

DEFINITIONS

Figure 1A:
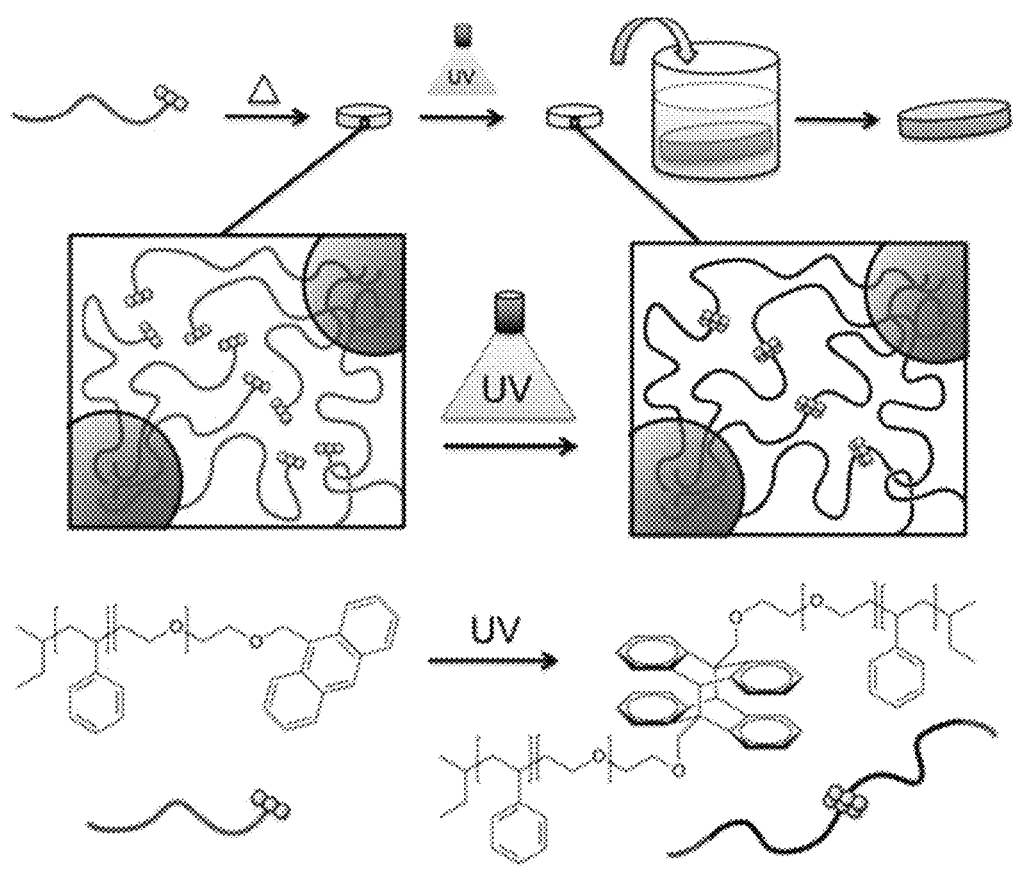
FIGS. 1A-1B are schematic representations of the hydrogel fabrication process.

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein "ambient temperature" is the temperature of the environment surrounding the process or experimental apparatus.

As used herein, the term "alkyl" describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

As used herein, the term "alkenyl" describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

As used herein, the term "alkynyl" describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

As used herein, the term "glass" refers to completely vitrified solids as well as to partially crystalline or glassy solids. Generally, a "glass" is a material below its glass transition temperature ($T_g$), as defined by for example differential scanning calorimetry (DSC) or dynamic mechanical analysis (DMA). Use temperatures defined as a range include all temperatures in which the swelling medium remains in the liquid phase. For aqueous media this may have a range including 0-100° C. For room temperature ionic liquids, as described herein, this may have a range from 0-160° C. Typically, the glassy domains may have a glass transition temperature of at least 60° C.

As used herein, the term "hydrogel" refers to a gel (substantially dilute cross-linked system) in which the liquid component is an aqueous medium.

When introducing elements of the present disclosure or the preferred embodiments(s) thereof, the articles "a," "an," "the," and "said" are intended to mean that there are one or more of the elements. The terms "comprising," "including," and "having" are intended to be inclusive and mean that there may be additional elements other than the listed elements.

As used herein, the term "monomer" refers to any chemical compound capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "block polymers." Monomers may belong to various chemical classes of molecules including organic, organometallic or inorganic molecules. The molecular weight of monomers may vary greatly between about 40 Daltons and 20000 Daltons. However, especially when monomers comprise repetitive building blocks, monomers may have even higher molecular weights. Monomers may also include additional reactive groups.

As used herein, the term "UV light" refers to electromagnetic radiation with a wavelength from 10 nm to 400 nm.

DETAILED DESCRIPTION OF THE INVENTION

Disclosed herein are thermoplastic elastomer (TPE) hydrogel networks and methods for fabricating the same that involve a single-component system in which UV irradiation can be used for mechanical property adjustment. The processed swellable polymer network is easily swollen in liquid media to give hydrogels exhibiting excellent mechanical properties and outstanding fatigue resistance.

The swellable polymer network is produced by using melt-state self-assembly of poly(A)-block-poly(B) or AB diblock copolymers, in which the coronal chain end has been functionalized with photodimerizable groups (AB-photo diblock copolymer). The AB-photo diblock copolymer self-assembles to form photoactive micelles of polystyrene (PS) cores and polyethylene oxide (PEO) coronas during melt-processing (FIG. 1). UV exposure is then used to induce chain end coupling through a [4+4] photo-cycloaddition between photodimerizable groups to form a symmetric ABA triblock copolymer in situ. Dimerization thus acts to tether spherical domains through direct ABA triblock copolymer formation, eliminating the necessity to pre-blend the triblock copolymer prior to melt processing (FIG. 1). Through the adjustment of UV irradiation time, the installed ABA triblock copolymer concentration can be controlled, producing hydrogels in which the resultant water content and mechanical property can be tuned. Further, the use of only an AB diblock copolymer allows for the shape of the resulting material to be set during melt processing.

Figure 1B:
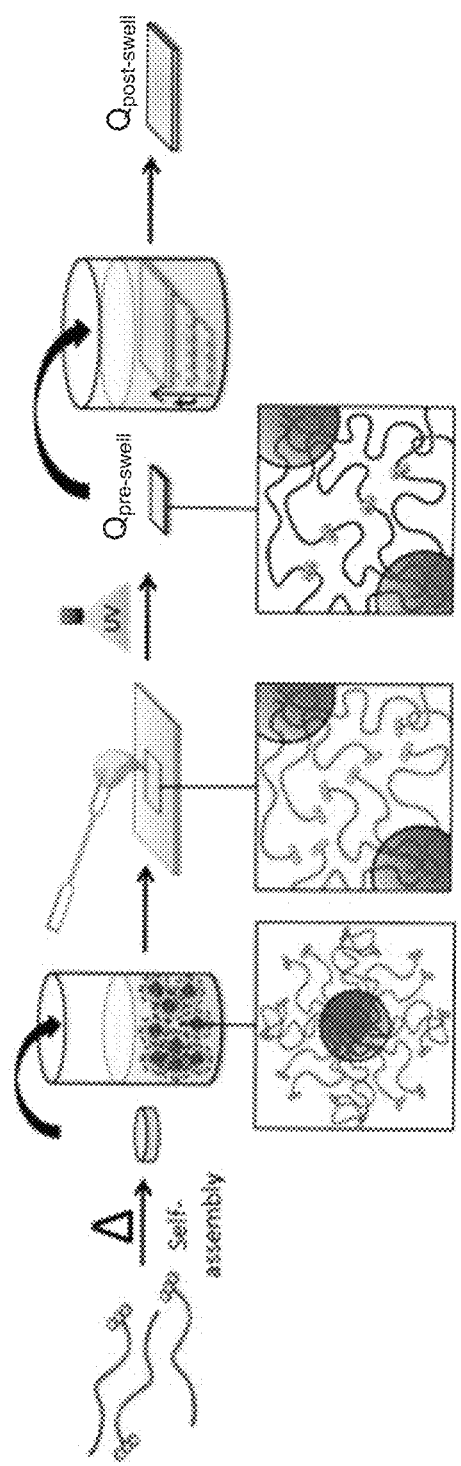

Additionally, as disclosed herein, dispersing melt-assembled AB diblock copolymer that has been functionalized with photodimerizable groups in water prior to UV irradiation, results in suspension of photoactive micelles in a pourable or spreadable medium (FIG. 1B). This malleable solution-based approach allows for molding of the liquid-like gel. These solutions can then be "set" using UV irradiation to tether the spheres, resulting in a more solid-like TPE hydrogel. This allows for the mechanical properties and shape to be set after the melt processing.

TPE hydrogels described herein possessed fatigue resistance (cumulative toughness) and elasticity not typically found in processable, physically crosslinked hydrogels. For example, the disclosed hydrogels have a fatigue resistance to at least 500,000 compression cycles.

Further, surprisingly, the AB-photo diblock copolymer systems described herein intrinsically retain the processability of traditional thermoplastics, even after UV exposure.

Thermoplastic Elastomeric Hydrogels Networks

The present disclosure provides block copolymer hydrogel, comprising a glass formed from an AB diblock copolymer in which the coronal chain end has been functionalized with photodimerizable groups (AB-photo) and a liquid medium at a concentration between about 32:1 and about 2:1 liquid medium/AB-photo copolymer by weight.

Block copolymer-based hydrogels have a regular structure attained through self-assembly in the melt state, leading to a more homogeneous network formation. This thermally processable gel formation allows the hydrogel to be shaped before swelling, and in some embodiments, prior to UV irradiation, giving it many industrial advantages of plastics, such as die-casting and coating capabilities. Also, adjusting the amount of ABA triblock formation through UV exposure, tuned the mechanical properties of the gel through a large range.

(i) AB-Photo Glass

The block copolymer hydrogels described herein comprise a glass formed from a dry blend comprising an AB diblock copolymer in which the coronal chain end has been functionalized with photodimerizable groups (AB-photo diblock copolymer).

The block copolymer may comprise at least one polyalkylene oxide block, especially polyethylene oxide (PEO). The PEO may have an average molecular weight of 3 kDa to 400 kDa. For example, the PEO may have an average molecular weight from about 3 kDa to about 5 kDa, from about 5 kDa to about 10 kDa, from about 10 kDa to about 15 kDa, from about 15 kDa to about 20 kDa, from about 20 kDa to about 25 kDa, from about 25 kDa to about 30 kDa, from about 30 kDa to about 35 kDa, from about 35 kDa to about 40 kDa from about 40 kDa to about 45 kDa, from about 45 kDa to about 50 kDa, from about 50 kDa to about 55 kDa, from about 55 kDa to about 60 kDa, from about 60 kDa to about 65 kDa, from about 65 kDa to about 70 kDa, from about 70 kDa to about 75 kDa, from about 75 kDa to about 80 kDa, from about 80 kDa to about 85 kDa, from about 85 kDa to about 90 kDa, from about 90 kDa to about 95 kDa, from about 95 kDa to about 100 kDa, from about 100 kDa to about 105 kDa, from about 105 kDa to about 110 kDa, from about 110 kDa to about 115 kDa, from about 115 kDa to about 120 kDa, from about 120 kDa to about 125 kDa, from about 125 kDa to about 130 kDa, from about 130 kDa to about 135 kDa, from about 135 kDa to about 140 kDa, from about 140 kDa to about 145 kDa, from about 145 kDa to about 150 kDa, from about 150 kDa to about 155 kDa, from about 155 kDa to about 160 kDa, from about 160 kDa to about 170 kDa, from about 170 kDa to about 180 kDa, from about 180 kDa to about 190 kDa, from about 190 kDa to about 200 kDa, from about 200 kDa to about 250 kDa, from about 250 kDa to about 300 kDa, from about 300 kDa to about 350 kDa, or from about 350 kDa to about 400 kDa. The PEO may have an average molecular weight of greater than about 100 kDa. The PEO may have an average molecular weight of less than 400 kDa.

The block copolymer may comprise at least one polystyrene block (PS). The PS may have an average molecular weight of 3 kDa to 160 kDa. For example, the PS may have an average molecular weight from about 3 kDa to about 5 kDa, from about 5 kDa to about 10 kDa, from about 10 kDa to about 15 kDa, from about 15 kDa to about 20 kDa, from about 20 kDa to about 25 kDa, from about 25 kDa to about 30 kDa, from about 30 kDa to about 35 kDa, from about 35 kDa to about 40 kDa from about 40 kDa to about 45 kDa, from about 45 kDa to about 50 kDa, from about 50 kDa to about 55 kDa, from about 55 kDa to about 60 kDa, from about 60 kDa to about 65 kDa, from about 65 kDa to about 70 kDa, from about 70 kDa to about 75 kDa, from about 75 kDa to about 80 kDa, from about 80 kDa to about 85 kDa, from about 85 kDa to about 90 kDa, from about 90 kDa to about 95 kDa, from about 95 kDa to about 100 kDa, from about 100 kDa to about 105 kDa, from about 105 kDa to about 110 kDa, from about 110 kDa to about 115 kDa, from about 115 kDa to about 120 kDa, from about 120 kDa to about 125 kDa, from about 125 kDa to about 130 kDa, from about 130 kDa to about 135 kDa, from about 135 kDa to about 140 kDa, from about 140 kDa to about 145 kDa, from about 145 kDa to about 150 kDa, from about 150 kDa to about 155 kDa, or from about 155 kDa to about 160 kDa. The PS may have an average molecular weight of greater than about 3 kDa. The PS may have an average molecular weight of less than 160 kDa. In particular, the PS may have an average molecular weight between about 5 kDa and about 20 kDa.

Upon heating, the copolymer may form domains of the at least one polystyrene block and of the at least one polyalkylene oxide block with domain sizes from about 5 nm to about 50 nm. For example, the domains may have sizes of about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 35 nm, about 40 nm, about 45 nm, or about 50 nm. The domain size may be greater than about 5 nm. The domain size may be less than 50 nm. In particular, the PEO domain is typically between about 22 nm and about 27 nm. The PS domain is typically between about 18 nm and about 20 nm. At higher molecular weights, the domain size of the PEO domain may be almost 50 nm.

In some embodiments, the diblock copolymer is poly (styrene)-b-poly(ethylene oxide).

In some embodiments, the polystyrene blocks may be hydrogenated, yielding cyclohexyl, cyclohexenyl, and cyclohexadienyl moieties. For example, PS domain of the block copolymer may be based on the hydrogenated forms of styrenic monomers, such as vinyl cylcohexylethylene. Hydrogenation may occur under increased partial pressure of hydrogen with or without a catalyst, such as palladium, platinum, rhodium, ruthenium, nickel, or other metal. The catalyst may have a support matrix, such as calcium carbonate ($CaCO_3$), carbon, or porous silica. Suitable examples of hydrogenation catalysts include palladium on carbon, palladium on calcium carbonate, and platinum on porous silica.

The coronal chain end of the diblock copolymer is functionalized with a photodimerizable group. Examples of suitable photodimerizable group include anthracene functional groups, nitrocinnamate functional groups, and coumarin functional groups.

In some embodiments, the block copolymer may have an average thickness of about 25 µm to about 100 µm, for example about 25 µm to about 30 µm, about 30 µm to about 35 µm, about 35 µm to about 40 µm, about 40 µm to about 45 µm, about 45 µm to about 50 µm, about 50 µm to about 55 µm, about 55 µm to about 60 µm, about 60 µm to about 65 µm, about 65 µm to about 70 µm, about 70 µm to about 75 µm, about 75 µm to about 80 µm, about 80 µm to about 85 µm, about 85 µm to about 90 µm, about 90 µm to about 95 µm, about 95 µm to about 100 µm. In a particular embodiment, the film is about 50 µm thick. The block copolymer may have an average thickness of about 10 µm to about 40 µm, such as between about 10 µm and about 15 µm, between about 15 µm and 20 µm, between about 20 µm and about 25 µm, between about 25 µm and about 30 µm, between about 30 µm and 35 µm, or between about 35 µm and about 40 µm. The block copolymer may have an average thickness of about 1 mm to about 5 mm, such as from about 1 mm to about 2 mm, from about 2 mm to about 3 mm, from about 3 mm to about 4 mm, or from about 4 mm to about 5 mm.

(ii) Liquid Medium

The copolymer hydrogel also comprises a liquid medium at a concentration of between about 32:1 and about 2:1 liquid medium/AB-photo by weight. The liquid medium may be an aqueous medium, a room-temperature ionic liquid (RTIL), a dialkylcarbonate, an alkylenecarbonate, or combinations thereof.

The aqueous medium may be water, a buffer, such as phosphate-buffered saline (PBS) or Ringer's solution, or the like. In particular, the aqueous medium may be buffer. In other embodiments, the aqueous medium may be water. By way of non-limiting examples, water includes distilled water, purified water, sterile water, filtered water (such as ultrafiltration (UF), reverse osmosis (RO)), deionized (DI) water, demineralized water, electrodieonized (EDI) water, USP purified water, laboratory grade water (such as Type I, Type II, or Type III as designated by the American Society for Testing and Materials D1193-06), bio-applications waters (American Society for Testing and Materials D5196-06), natural or tap water, and other types of treated, filtered, and/or purified water known to those of skill in the art.

The liquid medium may be a room-temperature ionic liquid (RTIL), which are relatively non-volatile, highly tunable molten salts whose melting points are below ambient temperature. RTILs are solvents with low viscosities (10-100 cP), low melting points, a range of densities, and relatively small molar volumes. Generally, RTILs consist of a cation and an anion.

The cation in the RTIL may be imidazolium, phosphonium, ammonium, and pyridinium. In particular embodiments, the RTIL comprises an imidazolium cation; that is, the RTIL is an imidazolium-based ionic liquid. Each cation may be substituted with one or more R groups, such as an imidazolium having the formula [Rmim] or [R$_2$mim], wherein "mim" references the imidiazolium. The R group may comprise one or more n-alkyl, branched alkyl, alkenyl, such as vinyl or allyl, alkynyl, fluoroalkyl, benzyl, styryl, hydroxyl, ether, amine, nitrile, silyl, siloxy, oligo(ethylene glycol), isothiocyanates, and sulfonic acids. In particular, the R group may be an alkyl selected from methyl or ethyl.

The RTIL may be functionalized with one, two, three, or more oligo(alkylene glycol) substituents, such as an oligo (ethylene glycol). Alternatively, the oligo(alkylene glycol) may be a methylene glycol or a propylene glycol.

A vicinal diol substituent on the RTILs may provide greater aqueous solubility and possible water miscibility.

Polymerizable RTILs may be provided choosing one or more R groups on the cation from a styrene, vinyl, allyl, or other polymerizable group.

Examples of suitable cations in the RTIL include, but are not limited to, 1-ethyl-3-methyl imidazolium ([EMIM]), 1-hexyl-3-methyl imidazolium ([HMIM]), 1-vinyl-3-ethyl-imidazolium ([VEIM]), 1-allyl-3-methyl-imidazolium ([AMIM]), 1-hexyl-3-butyl-imidazolium ([HBIM]), 1-vinyl-3-methylimidazolium ([VMIM]), 1-hydroxyundecanyl-3-methylimidazolium ([(C$_{11}$OH)MIM]), tetrabutylphosphonium ([P4444]), 1-(2,3-dihydroxypropyl)-alkyl imidazolium ([(dhp)MIM]), and combinations thereof. For example, the cation may be 1-ethyl-3-methyl imidazolium ([EMIM]). The cation may be 1-hexyl-3-methyl imidazolium ([HMIM]). The cation may be 1-vinyl-3-ethyl-imidazolium ([VEIM]). The cation may be 1-allyl-3-methyl-imidazolium ([AMIM]). The cation may be 1-hexyl-3-butyl-imidazolium ([HBIM]), 1-vinyl-3-methylimidazolium ([VMIM]). The cation may be 1-hydroxyundecanyl-3-methylimidazolium ([(C$_{11}$OH)MIM]). The cation may be tetrabutylphosphonium ([P4444]). The cation may also be 1-(2,3-dihydroxypropyl)-alkyl imidazolium ([(dhp)MIM]).

Suitable anions (X) in the RTIL include, but are not limited to, triflate (OTf), dicyanamide (DCA), tricyanomethanide (TCM), tetrafluoroborate (BF4), hexafluorophosphate (PF6), taurinate (Tau), and bis(trifluoromethane)sulfonimide (TSFI). For example, the anion may be triflate (OTf). The anion may be dicyanamide (DCA). The anion may be tricyanomethanide (TCM). The anion may be tetrafluoroborate (BF4). The anion may be hexafluorophosphate (PF6). The anion may be taurinate (Tau). The anion may be bis(trifluoromethane)sulfonimide (TSFI).

Any combination of cations and anions described herein may be used to form a suitable RTIL. Examples of suitable RTILs include, but are not limited to, 1-ethyl-3-methyl imidazolium bis(trifluoromethane)sulfonamide ([EMIM][TFSI]), 1-hexyl-3-methyl imidazolium bis(trifluoromethane)sulfonamide ([HMIM][TFSI]), 1-vinyl-3-ethyl-imidazolium bis(trifluoromethane)sulfonamide ([VEIM][TFSI]), 1-allyl-3-methyl-imidazolium bis(trifluoromethane)sulfonamide ([AMIM][TFSI]), 1-hexyl-3-butyl-imidazolium bis(trifluoromethane)sulfonamide ([HBIM][TFSI]), 1-vinyl-3-methylimidazolium bis(trifluoromethane)sulfonamide ([VMIM][TFSI]), 1-hydroxyundecanyl-3-methylimidazolium bis(trifluoromethane)sulfonamide ([(C$_{11}$OH)MIM][TFSI]), 1-ethyl-3-methylimidazolium tricyanomethanide ([EMIM][TCM]), tetrabutylphosphonium taurinate, ([P4444][Tau]), 1-ethyl-3-methylimidazolium dicyanamide ([EMIM][DCA]), 1-(2,3-dihydroxypropyl)-alkyl imidazolium dicyanamide ([(dhp)MIM][DCA]), 1-(2,3-dihydroxypropyl)-3-alkyl imidazolium tetrafluoroborate ([(dhp)MIM][BF4]), 1-(2,3-dihydroxypropyl)-3-alkyl imidazolium bis(trifluoromethane)sulfonimide ([(dhp)MIM][TFSI]), 1-(2,3-dihydroxypropyl)-3-alkyl imidazolium hexafluorophosphate ([(dhp)MIM][PF6]), or combinations thereof.

For example, the RTIL may be 1-ethyl-3-methyl imidazolium bis(trifluoromethane)sulfonamide ([EMIM][TFSI]). The RTIL may be 1-hexyl-3-methyl imidazolium bis(trifluoromethane)sulfonamide ([HMIM][TFSI]). The RTIL may be 1-vinyl-3-ethyl-imidazolium bis(trifluoromethane) sulfonamide ([VEIM][TFSI]). The RTIL may be 1-allyl-3-methyl-imidazolium bis(trifluoromethane)sulfonamide ([AMIM][TFSI]). The RTIL may be 1-hexyl-3-butyl-imidazolium bis(trifluoromethane)sulfonamide ([HBIM][TFSI]). The RTIL may be 1-vinyl-3-methylimidazolium bis(trifluoromethane)sulfonamide ([VMIM][TFSI]). The RTIL may be 1-hydroxyundecanyl-3-methylimidazolium bis(trifluoromethane)sulfonamide ([($C_{11}$OH)MIM][TFSI]). The RTIL may be 1-ethyl-3-methylimidazolium tricyanomethanide ([EMIM][TCM]). The RTIL may be tetrabutylphosphonium taurinate. The RTIL may be ([P4444][Tau]). The RTIL may be 1-ethyl-3-methylimidazolium dicyanamide ([EMIM][DCA]). The RTIL may be 1-(2,3-dihydroxypropyl)-alkyl imidazolium dicyanamide ([(dhp)MIM][DCA]). The RTIL may be 1-(2,3-dihydroxypropyl)-3-alkyl imidazolium tetrafluoroborate ([(dhp)MIM][BF4]). The RTIL may be 1-(2,3-dihydroxypropyl)-3-alkyl imidazolium bis(trifluoromethane)sulfonimide ([(dhp)MIM][TFSI]). The RTIL may also be 1-(2,3-dihydroxypropyl)-3-alkyl imidazolium hexafluorophosphate ([(dhp)MIM][PF6]). These exemplary RTILs are further illustrated below at Table 1.

TABLE 1

Exemplary RTILs.

| Abbreviation | Chemical Name | Structure |
| --- | --- | --- |
| [EMIM][TSFI] | 1-ethyl-3-methylimidazolium bis(trifluoromethane)sulfonimide | |
| [VEIM][TSFI] | 1-vinyl-3-ethyl-imidazolium bis(trifluoromethane)sulfonimide | |
| [HMIM][TSFI] | 1-hexyl-3-methyl-imidazolium bis(trifluoromethane)sulfonimide | |
| [AMIM][TSFI] | 1-allyl-3-methyl-imidazolium bis(trifluoromethane)sulfonimide | |

TABLE 1-continued

Exemplary RTILs.

| Abbreviation | Chemical Name | Structure |
| --- | --- | --- |
| [HBIM][TSFI] | 1-hexyl-3-butyl-imidazolium bis(trifluoromethane)sulfonimide | |
| [VMIM][TSFI] | 1-vinyl-3-methylimidazolium bis(trifluoromethane)sulfonimide | |
| [($C_{11}$OH)MIM][TSFI] | 1-hydroxyundecanyl-3-methylimidazolium bis(trifluoromethane)sulfonimide | |
| [EMIM][TCM] | 1-ethyl-3-methylimidazolium tricyanomethanide | |
| [P4444][Tau] | tetrabutylphosphonium taurinate | |

TABLE 1-continued

Exemplary RTILs.

| Abbreviation | Chemical Name | Structure |
|---|---|---|
| [EMIM][DCA] | 1-ethyl-3-methylimidazolium dicyanamide | |
| [DMIM][Tf2N] or [DEIM][Tf2N] | 1-(2,3-dihydroxypropyl)-3-methylimidazolium bis(trifluoromethanesulfonimide) or 1-(2,3-dihydroxypropyl)-3-ethylimidazolium bis(trifluoromethanesulfonimide) | |
| [DMIM][BF4] or [DEIM][BF4] | 1-(2,3-dihydroxypropyl)-3-methylimidazolium tetrafluoroborate or 1-(2,3-dihydroxypropyl)-3-ethylimidazolium tetrafluoroborate | |
| [DMIM][DCA] or [DEIM][DCA] | 1-(2,3-dihydroxypropyl)-3-methylimidazolium dicyanamide or 1-(2,3-dihydroxypropyl)-3-ethylimidazolium dicyanamide | |
| [DMIM][PF6] or [DEIM][PF6] | 1-(2,3-dihydroxypropyl)-3-methylimidazolium hexafluorophosphate or 1-(2,3-dihydroxypropyl)-3-ethylimidazolium hexafluorophosphate | |

The RTIL may be [Rmim][TSFI]. In particular, the RTIL may be [Rmim][TSFI], wherein R is ethyl; that is, the RTIL may be 1-ethyl-3-methylimidazolium bis(trifluoromethanesulfonyl)imide ([EMIM][TSFI]).

The liquid medium may comprise a dialkylcarbonate. Dialkylcarbonates have the general formula RO—C(O)—OR', were R and R' are independently alkyl and are not taken together to form a cyclic ring. In some embodiments, the alkyl selected from the group consisting of methyl, ethyl, propyl, isopropyl, n-butyl, isobutyl, sec-butyl, and tert-butyl. In other embodiments, the alkyl is optionally substituted with one or more alkyl, alkoxyl, or hydoxy groups.

Examples of suitable dialkylcarbonates include dimethylcarbonate, ethylmethylcarbonate, diethylcarbonate, ethylpropylcarbonate, methylpropylcarbonate, dipropylcarbonate, butylethylcarbonate, butylpropylcarbonate, butylmethylcarbonate, and dibutylcarbonate. The liquid medium may be dimethylcarbonate (DMC). The liquid medium may be diethylcarbonate (DEC)

The liquid medium may comprise an alkylenecarbonate. Alkylenecarbonates have the general formula RO—C(O)—OR', were R and R' are alkyl and taken together to form a cyclic ring. In some embodiments, the alkylene are selected from the group consisting of ethylene, propylene, isopropylene, n-butylene, isobutylene, sec-butylene, and tert-butylene. In other embodiments, the alkylene is optionally substituted with one or more alkyl, alkoxyl, or hydoxy groups. Examples of suitable alkylenecarbonates include ethylenecarbonate, propylenecarbonate, and butylenecarbonate. The liquid medium may be ethylene carbonate (EC). The liquid medium may be propylene carbonate (PC).

The liquid medium may be a liquid electrolyte. The liquid electrolyte may comprise dialkylcarbonate, alkylenecarbonate, or combination thereof. The liquid electrolyte may further comprise a lithium salt, such as lithium perchlorate or lithium hexafluorophosphate. Suitable liquid electrolytes include, but are not limited to, 1 M lithium perchlorate ($LiClO_4$) in ethylenecarbonate/diethylcarbonate/dimethylcarbonate (EC/DEC/DMC, 1:1:1 by volume), 1 M lithium hexafluorophosphate ($LiPF_6$) in ethylenecarbonate/diethylcarbonate (EC/DEC, 1:1 by volume), 1 M lithium hexafluorophosphate ($LiPF_6$) in dimethylcarbonate (DMC), dimethylcarbonate, diethylcarbonate, and propylenecarbonate. The liquid electrolyte may be 1 M lithium perchlorate ($LiClO_4$) in ethylenecarbonate/diethylcarbonate/dimethylcarbonate (EC/DEC/DMC, 1:1:1 by volume). The liquid electrolyte may be 1 M lithium hexafluorophosphate ($LiPF_6$) in ethylenecarbonate/diethylcarbonate (EC/DEC, 1:1 by volume). The liquid electrolyte may be 1 M lithium hexafluorophosphate ($LiPF_6$) in dimethylcarbonate (DMC). The liquid electrolyte may be dimethylcarbonate. The liquid electrolyte may be diethylcarbonate. The liquid electrolyte may be propylenecarbonate.

The liquid medium may be a mixture of an aqueous medium and an RTIL. For such mixtures, the volume ratio may be between about 99:1 and about 1:99 aqueous medium/RTIL, such as between about 99:1 and about 95:5 aqueous medium/RTIL, between about 95:5 and about 90:10 aqueous medium/RTIL, between about 90:10 and about 85:15 aqueous medium/RTIL, between about 85:15 and about 80:20 aqueous medium/RTIL, between about 80:20 and about 75:25 aqueous medium/RTIL, between about 75:25 and about 70:30 aqueous medium/RTIL, between about 70:30 and about 65:35 aqueous medium/RTIL, between about 65:35 and about 60:40 aqueous medium/RTIL, between about 60:40 and about 55:45 aqueous medium/RTIL, between about 55:45 and about 50:50 aqueous medium/RTIL, between about 50:50 and about 55:45 aqueous medium/RTIL, between about 55:45 and about 45:65 aqueous medium/RTIL, between about 45:65 and about 40:60 aqueous medium/RTIL, between about 40:60 and about 35:65 aqueous medium/RTIL, between about 35:65 and about 30:70 aqueous medium/RTIL, between about 30:70 and about 25:75 aqueous medium/RTIL, between about 25:75 and about 20:80 aqueous medium/RTIL, between about 20:80 and about 15:85 aqueous medium/RTIL, between about 15:85 and about 10:90 aqueous medium/RTIL, between about 10:90 and about 5:95 aqueous medium/RTIL, or between about 5:95 and about 1:99 aqueous medium/RTIL. In particular, the molar ratio may between about 70:30 and about 20:80 aqueous medium/RTIL, between about 60:40 and about 30:70 aqueous medium/RTIL, or at about 40:60 aqueous medium/RTIL.

Generally, the copolymer hydrogel may have a water concentration between about 32:1 and 2:1 water/AB-photo by weight, such as between about 32:1 to 30:1 water/AB-photo by weight, between about 30:1 to 28:1 water/AB-photo by weight, between about 28:1 to 26:1 water/AB-photo by weight, between about 26:1 to 24:1 water/AB-photo by weight, between about 24:1 to 22:1 water/AB-photo by weight, between about 22:1 to 20:1 water/AB-photo by weight, between about 20:1 to 18:1 water/AB-photo by weight, between about 18:1 to 16:1 water/AB-photo by weight, between about 16:1 to 14:1 water/AB-photo by weight, between about 14:1 to 12:1 water/AB-photo by weight, between about 12:1 to 10:1 water/AB-photo by weight, between about 10:1 to 8:1 water/AB-photo by weight, between about 8:1 to 6:1 water/AB-photo by weight, between about 6:1 to 4:1 water/AB-photo by weight, or between about 4:1 to 2:1 water/AB-photo by weight. The water concentration of the hydrogel may be between about 16:1 and about 4:1 water/AB-photo by weight.

Generally, the copolymer hydrogel may have a liquid medium concentration between about 32:1 and 2:1 liquid medium/AB-photo by weight, such as between about 32:1 to 30:1 liquid medium/AB-photo by weight, between about 30:1 to 28:1 liquid medium/AB-photo by weight, between about 28:1 to 26:1 liquid medium/AB-photo by weight, between about 26:1 to 24:1 liquid medium/AB-photo by weight, between about 24:1 to 22:1 liquid medium/AB-photo by weight, between about 22:1 to 20:1 liquid medium/AB-photo by weight, between about 20:1 to 18:1 liquid medium/AB-photo by weight, between about 18:1 to 16:1 liquid medium/AB-photo by weight, between about 16:1 to 14:1 liquid medium/AB-photo by weight, between about 14:1 to 12:1 liquid medium/AB-photo by weight, between about 12:1 to 10:1 liquid medium/AB-photo by weight, between about 10:1 to 8:1 liquid medium/AB-photo by weight, between about 8:1 to 6:1 liquid medium/AB-photo by weight, between about 6:1 to 4:1 liquid medium/AB-photo by weight, or between about 4:1 to 2:1 liquid medium/AB-photo by weight. The liquid medium concentration of the hydrogel may be between about 16:1 and about 4:1 liquid medium/AB-photo by weight.

(iii) Therapeutic Agents

The block copolymer hydrogels described herein may further comprise an active pharmaceutical ingredient, such as a drug, a biological factor, therapeutic agent, or pharmaceutical agent. These hydrogels may be formed into a soft tissue mimetic, providing an implantable medical device, or they may coat the surface of a medical device.

As such, the block copolymer hydrogels may be used to deliver therapeutic and pharmaceutical agents including, but not limited to, anti-proliferative/antimitotic agents including natural products such as vinca alkaloids (i.e. vinblastine, vincristine, and vinorelbine), paclitaxel, epipidophyllotoxins (i.e. etoposide, teniposide), antibiotics (dactinomycin (actinomycin D) daunorubicin, doxorubicin and idarubicin), anthracyclines, mitoxantrone, bleomycins, plicamycin (mithramycin) and mitomycin, enzymes (L-asparaginase which systemically metabolizes L-asparagine and deprives cells which do not have the capacity to synthesize their own asparagine); antiplatelet agents such as G(GP) II b/HI a inhibitors and vitronectin receptor antagonists; antiproliferative/antimitotic alkylating agents such as nitrogen mustards (mechlorethamine, cyclophosphamide and analogs, melphalan, chlorambucil), ethylenimines and methylmelamines (hexamethylmelamine and thiotepa), alkyl sulfonates-busulfan, nirtosoureas (carmustine (BCNU) and analogs, strep tozocin), trazenes-dacarbazinine (DTIC); anti-proliferative/antimitotic antimetabolites such as folic acid analogs (methotrexate), pyrimidine analogs (fluorouracil, floxuridine, and cytarabine), purine analogs and related inhibitors (mercaptopurine, thioguanine, pentostatin and 2-chlorodeoxyadenosine {cladribine}); platinum coordination complexes (cisplatin, carboplatin), procarbazine, hydroxyurea, mitotane, aminoglutethimide; hormones (i.e. estrogen); anticoagulants (heparin, synthetic heparin salts and other inhibitors of thrombin); fibrinolytic agents (such as tissue plasminogen activator, streptokinase and urokinase), aspirin, dipyridamole, ticlopidine, clopidogrel, abciximab; antimigratory; antisecretory (breveldin); anti-inflammatory: such as adrenocortical steroids (Cortisol, cortisone, fludrocortisone, prednisone, prednisolone, 6α-methylprednisolone, triamcinolone, betamethasone, and dexamethasone), non-steroidal agents (salicylic acid derivatives i.e. aspirin; para-aminophenol derivatives i.e. acetaminophen; indole and indene acetic acids (indomethacin, sulindac, and etodalac), heteroaryl acetic acids (tolmetin, diclofenac, and ketorolac), arylpropionic acids (ibuprofen and derivatives), anthranilic acids (mefenamic acid, and meclofenamic acid), enolic acids (piroxicam, tenoxicam, phenylbutazone, and oxyphenthatrazone), nabumetone, gold compounds (auranofin, aurothioglucose, gold sodium thiomalate); immunosuppressives: (cyclosporine, tacrolimus (FK-506), sirolimus (rapamycin), everolimus, azathioprine, mycophenolate mofetil); angiogenic agents: vascular endothelial growth factor (VEGF), fibroblast growth factor (FGF); angiotensin receptor blockers; nitric oxide donors; antisense oligonucleotides and combinations thereof; cell cycle inhibitors, mTOR inhibitors, and growth factor receptor signal transduction kinase inhibitors; retenoids; cyclin/CDK inhibitors; HMG co-enzyme reductase inhibitors (statins); and protease inhibitors. Also, it should be recognized that many active agents have multiple pharmaceutical uses other than those specifically recited.

The therapeutic and pharmaceutical agent may be present in the hydrogel at an amount from about 10 µg/cm$^2$ (micrograms drug/area of stent) to about 2000 µg/cm$^2$, such as from about 100 µg/cm$^2$ to about 1000 µg/cm$^2$, or from about 200 µg/cm$^2$ to about 500 µg/cm$^2$. In exemplary embodiments, the drug per area can include 150 µg/cm$^2$ to about 500 µg/cm$^2$, such as from about 175 µg/cm$^2$ to about 400 µg/cm$^2$, or from about 200 µg/cm$^2$ to about 300 µg/cm$^2$. Within this narrower range, the drug per area can include 210 µg/cm$^2$ to about µg/cm$^2$, or from about 215 µg/cm$^2$, to about 250 µg/cm$^2$, or 225 µg/cm$^2$±µg/cm$^2$. Alternatively, the amount of therapeutic and pharmaceutical agents in the hydrogel may be described as the total amount of drug per device. Accordingly, the amount of drug may be from about 0.5 mg to about 12 mg, such as from about 0.75 mg to about 10 mg, or from about 1 mg to about 5 mg.

The hydrogel and therapeutic and pharmaceutical agent may be configured to cooperate so as to form a diffusion pathway (e.g., lipophilic, hydrophilic and/or amphipathic) with tissue when the soft tissue mimetic or medical device is disposed in a body, such that the drug diffuses into the tissue over a body fluid passing through the body such that a maximum systemic blood concentration of the therapeutic and pharmaceutical agent is less than or about 30 ng/ml, less than or about 20 ng/ml, or less than or about 10 ng/ml. In one embodiment, the hydrogel may control the systemic delivery of the therapeutic and pharmaceutical agent so as to retain a sufficiently low concentration and inhibit negative systemic side effects. As such, the systemic delivery of the therapeutic and pharmaceutical agent may provide a preselected blood maximum concentration.

Method of Making the Block Copolymer Material

The present disclosure provides a method for preparing a block copolymer hydrogel. The method comprises heating a dry blend of poly(styrene)-b-poly(ethylene oxide) diblock copolymer in which the coronal chain end has been functionalized with photo-dimerizable a groups (AB-photo) to form an AB-photo diblock melt. The AB-photo diblock melt is then irradiated with UV light to induce chain end coupling, to form a symmetric ABA triblock copolymer in situ. The UV irradiated AB-photo diblock melt may then be cooled. In some instances, the AB-photo diblock melt is allowed to attain ambient temperature. The AB-photo melt is then contacted with a liquid medium to form a block copolymer hydrogel.

In another aspect the present disclosure also provides a method for preparing a block copolymer hydrogel that comprises heating a dry blend of poly(styrene)-b-poly(ethylene oxide) diblock copolymer in which the coronal chain end has been functionalized with photo-dimerizable a groups (AB-photo) to form an AB-photo diblock melt and allowing the AB-photo diblock melt to attain ambient temperature to form an AB-photo glass. The AB-photo glass is then dispersed in a liquid medium to form an AB-photo diblock polymer solution. The AB-photo diblock polymer solution is then placed or injected in a mold, or otherwise shaped, and irradiated with UV light to induce chain end coupling, to form a symmetric ABA triblock copolymer in situ. The UV irradiation results in a block copolymer hydrogel. In some instances, the block copolymer hydrogel is then contacted with a liquid medium.

In some embodiments, the AB diblock copolymer is poly(styrene)-b-poly(ethylene oxide) (SO) and the photodimerzable group is anthracene (SO-anth).

Functionalizing the coronal chain end of AB diblock copolymer with a photodimerizable group can be accomplished by techniques known to those of skill in the art with appropriate photodimerzable groups. By way of a non-limiting example, nucleophilic substitution reaction may be utilized. For example, poly(styrene)-b-poly(ethylene oxide) (SO) may be functionalized with anthracene using a nucleophilic substitution reaction with 9-chloromehtyl anthracene. Further, any suitable photodimerzable groups may be used. For example, any photodimerzable group disclosed herein may be used.

The AB-photo diblock copolymer is then melt-processed. The melt-processing involves exposing the AB-photo diblock copolymer to heat for a period of time to form an AB-photo melt. The AB-photo diblock copolymer may be heated to a temperature between about 100° C. and about 180° C., such as between about 100° C. and about 110° C., between about 110° C. and about 120° C., between about 120° C. and about 130° C., between about 130° C. and about 140° C., between about 140° C. and about 150° C., between about 150° C. and about 160° C., between about 160° C. and about 170° C., or between about 170° C. and about 180° C. The temperature may be between about 140° C. and about 160° C., such as about 150° C.

The AB-photo diblock copolymer may be heated without or without pressure. If heated under pressure, the AB-photo diblock copolymer may be heated under a pressure between about 50 psig and about 800 psig, such as between about 50 psig and about 100 psig, between about 100 psig and about 150 psig, between about 150 psig and about 200 psig, between about 200 psig and about 250 psig, between about 250 psig and about 300 psig, between about 300 psig and about 350 psig, between about 350 psig and about 400 psig, between about 400 psig and about 450 psig, between about 450 psig and about 500 psig, between about 500 psig and about 550 psig, between about 550 psig and about 600 psig, between about 600 psig and about 650 psig, between about 650 psig and about 700 psig, between about 700 psig and about 750 psig, or between about 750 psig and about 800 psig. In particular, the pressure may be between about 200 psig and about 600 psig, or at about 500 psig.

Additionally, pressure may be applied to samples of the AB-photo diblock copolymer placed in a vacuum bag, such that a dynamic reduced pressure of less than 20 Torr inside the bag is achieved during heating. That is, the sample may be placed into a vacuum bag during operation of the press used to heat and squeeze the sample.

The AB-photo diblock copolymer may be heated for between about 5 minutes and about 50 minutes, such as between about 5 minutes and about 10 minutes, between about 10 minutes and about 15 minutes, between about 15 minutes and about 20 minutes, between about 20 minutes and about 25 minutes, between about 25 minutes and about 30 minutes, between about 30 minutes and about 35 minutes, between about 35 minutes and about 40 minutes, between about 40 minutes and about 45 minutes, or between about 5 minutes and about 50 minutes. In particular, the AB-photo diblock copolymer may be heated for about 25 minutes, or for about 5 minutes.

The heating may occur in heating-cooling cycles, wherein the AB-photo diblock copolymer is heated for a period of time and then allowed to cool to ambient temperature before re-heating. For example, the AB-photo diblock copolymer may be heated for a period of 5 minutes and then allowed to cool to ambient temperature before reheating. Generally, the dry blend may pass through 1 to 10 cycles. Any combination of these features may be used for processing the AB-photo diblock copolymer. For example, the AB-photo diblock copolymer may be heated at 150° C. at 500 psig in a vacuum bag for 4 heating-cooling cycles.

In some instances, the AB-photo diblock melt is cooled. The AB-photo diblock melt may be allowed to attain a temperature of about 70° C. to about 100° C. In other instances, the AB-photo diblock melt may be allowed to attain ambient temperature to form an AB-photo glass.

In some embodiments the AB-photo glass is then dispersed in water to form a viscous solution (AB-photo diblock solution). During the melt-processing the AB-photo diblock self-assembles into micelles. When the self-assembled micelles of the AB-photo glass are dispersed in water, the result is a suspension of photoactive micelles in a pourable or spreadable medium (AB-photo diblock solution). This malleable solution-based approach allows for molding of the liquid-like gel.

The AB-photo diblock solution or the AB-photo melt is then exposed to ultraviolet light (UV light). In some embodiments, 320-380 nm UV light is employed. In other embodiments, 365 nm UV light is employed.

The AB-photo diblock solution or AB-photo melt is exposed to UV light for a period of time to produce ABA triblock copolymer. Increased UV light exposure time results in increased concentrations of ABA triblock copolymer. Thus, the duration of UV light exposure can be varied to produce the desired ABA triblock copolymer concentration.

The AB-photo diblock solution or AB-photo melt may be exposed to UV light for about 1 to about 30 minutes, such as about 1 minute to about 5 minutes, about 5 minutes to about 10 minutes, about 10 minutes to about 15 minutes, about 15 minutes to about 20 minutes, about 20 minutes to about 25 minutes, or about 25 minutes to about 30 minutes. In particular, the AB-photo glass may be exposed to UV light for about 2 minutes, about 4 minutes, about 6 minutes, about 8 minutes, about 10 minutes, about 12 minutes, about 14 minutes, about 16 minutes, about 18 minutes, about 20 minutes, about 22 minutes, or about 24 minutes.

During exposure to UV light, the AB-photo diblock solution or AB-photo melt or the UV light source may be manipulated to affect the ABA triblock copolymer concentration in the glass. A gradient of ABA triblock copolymer concentration may occur if exposure of the melt/glass to UV light is not uniform. This gradient can be asymmetric or symmetric. By manipulating the position of the AB-photo diblock solution or AB-photo melt or source of UV light, the gradient can be adjusted and controlled. By way of a non-limiting example, the AB-photo diblock solution or AB-photo melt may be flipped over halfway through the exposure time to ensure that the gradient remains symmetric about the axial center of the glass.

After UV irradiation, the AB-photo diblock solution will have formed a block copolymer hydrogel. The block copolymer hydrogel may be further contacted with a liquid medium. Any liquid medium described herein may be used. The liquid medium may be the same liquid medium used to form the AB-photo diblock polymer solution, a different (second) liquid medium, or combinations thereof.

The UV irradiated AB-photo melt is then contacted with a liquid medium to form a block copolymer hydrogel. Any liquid medium described herein may be used.

The UV irradiated AB-photo melt and/or block copolymer hydrogel may be contacted with the liquid medium at a temperature above 0° C. and below about 160° C., such as above 0° C. and below about 20° C., or at about 10° C. The temperature may be between about 0° C. and about 5° C., between about 5° C. and about 10° C., between about 10° C. and about 15° C., between about 15° C. and about 20° C., between about 20° C. and about 25° C., between about 25° C. and about 30° C., between about 30° C. and about 35° C., between about 35° C. and about 40° C., between about 40° C. and about 45° C., between about 45° C. and about 50° C., between about 50° C. and about 55° C., between about 55° C. and about 60° C., between about 60° C. and about 65° C., between about 65° C. and about 70° C., between about 70° C. and about 75° C., between about 75° C. and about 80° C., between about 80° C. and about 85° C., between about 85° C. and about 90° C., between about 90° C. and about 95° C., between about 95° C. and about 100° C., between about 100° C. and about 105° C., between about 105° C. and about 110° C., between about 110° C. and about 115° C., between about 115° C. and about 120° C., between about 120° C. and about 125° C., between about 125° C. and about 130° C., between about 130° C. and about 135° C., between about 135° C. and about 140° C., between about 140° C. and about 145° C., between about 145° C. and about 150° C., between about 150° C. and about 155° C., or between about 155° C. and about 160° C.

In some embodiments, after swelling, the block copolymer hydrogel may have a concentration of liquid medium between about 32:1 and 2:1 liquid medium/AB-photo by weight, such as between about 32:1 to 30:1 liquid medium/AB-photo by weight, between about 30:1 to 28:1 water/AB-photo by weight, between about 28:1 to 26:1 liquid medium/AB-photo by weight, between about 26:1 to 24:1 liquid medium/AB-photo by weight, between about 24:1 to 22:1 liquid medium/AB-photo by weight, between about 22:1 to 20:1 liquid medium/AB-photo by weight, between about 20:1 to 18:1 liquid medium/AB-photo by weight, between about 18:1 to 16:1 liquid medium/AB-photo by weight, between about 16:1 to 14:1 liquid medium/AB-photo by weight, between about 14:1 to 12:1 liquid medium/AB-photo by weight, between about 12:1 to 10:1 liquid medium/AB-photo by weight, between about 10:1 to 8:1 liquid medium/SO-photo by weight, between about 8:1 to 6:1 liquid medium/AB-photo by weight, between about 6:1 to 4:1 liquid medium/AB-photo by weight, or between about 4:1 to 2:1 liquid medium/AB-photo by weight. The liquid concentration of the hydrogel may be between about 16:1 and about 4:1 liquid medium/AB-photo by weight.

In other embodiments, after swelling, the block copolymer hydrogel may have a concentration of water between about 32:1 and 2:1 water/AB-photo by weight, such as between about 32:1 to 30:1 water/AB-photo by weight, between about 30:1 to 28:1 water/AB-photo by weight, between about 28:1 to 26:1 water/AB-photo by weight, between about 26:1 to 24:1 water/AB-photo by weight, between about 24:1 to 22:1 water/AB-photo by weight, between about 22:1 to 20:1 water/AB-photo by weight, between about 20:1 to 18:1 water/AB-photo by weight, between about 18:1 to 16:1 water/AB-photo by weight, between about 16:1 to 14:1 water/AB-photo by weight, between about 14:1 to 12:1 water/AB-photo by weight, between about 12:1 to 10:1 water/AB-photo by weight, between about 10:1 to 8:1 water/AB-photo by weight, between about 8:1 to 6:1 water/AB-photo by weight, between about 6:1 to 4:1 water/AB-photo by weight, or between about 4:1 to 2:1 water/AB-photo by weight. The water concentration of the hydrogel may be between about 16:1 and about 4:1 water/AB-photo by weight.

The block copolymer hydrogel may have a fatigue resistance to at least 500,000 compression cycles, such as at least 600,000 compression cycles, such as at least 700,000 compression cycles, such as at least 800,000 compression cycles, such as at least 900,000 compression cycles, such as at least 1,000,000 compression cycles, such as at least 1,500,000 compression cycles, such as at least 2,000,000 compression cycles, such as at least 2,500,000 compression cycles, such as at least 3,000,000 compression cycles, such as at least 3,500,000 compression cycles, such as at least 4,000,000 compression cycles, such as at least 4,500,000 compression cycles, such as at least 5,000,000 compression cycles, or such as at least 10,000,000 compression cycles. In counting the number of compression cycles, the cycles are preferably continuous, but need not be so, having a resting period between shorter runs of cycles.

The compression cycles may operate with at least 12% compression at a frequency of about 1 Hz, particularly wherein the compression cycles operate with at least 50% compression at least every eleventh cycle. The fatigue resistance is characterized by a modulus recoverable to at least 80% of its value before the compression cycles were run, such as to at least 90%, to at least 92%, to at least 95% or to at least 98% of its value before the compression cycles were run.

(C) Applications

The hydrogels disclosed herein may be used in many applications. For example they may be used as hydrated adhesives, coating materials, elastic separation membranes (such as for light gases, protein assemblies, and biologics), medical devices (such as soft tissue mimetics), coatings on medical devices, and mechanical energy absorbers (such that found in footwear, sportswear, helmets and other protective gear, and sports equipment).

The disclosed hydrogels and methods have wide utility in biological and medical applications due to their inherent biocompatibility. Notably, the precursor solution is made from water and large (20 million molecular weight), innocuous building blocks, comprising of no small molecule by-products or catalysts which pose the risk of being released during photocoupling, as is a potential hazard in other systems. Next, the construct involves no harmful solvents, only water. Tethering, or photocoupling, can be performed at room temperature, allowing for the incorporation of any thermally sensitive material if needed, such as. This tethering of anthracene chain ends also occurs very quickly due to the tendency of the molecule to pre-organize into preferential $\pi$-$\pi$ stacking. The solutions very quickly transform from a viscous gel to something quite elastic, exhibiting those properties of TPE hydrogels. Due to the distance between micelles upon photocoupling, the resulting hydrogel exhibits modulus values significantly lower than those when photocoupling is performed in the melt-state. The use of these solution coupling extends the range of moduli of these biomedically relevant AB-photo systems to include that of lower modulus applications such as wound healing, reconstructive surgery, soft tissue repair and/or replacement, and cosmetics. Both the hydrogels and solutions are highly stable over time. Additionally, these systems have shown evidence of being easily patternable, indicating a possibility for asymmetric reinforcement and spatial tunability of mechanical properties which may be useful in applications which require such attributes.

EXAMPLES

The following examples are provided for illustrative purposes only and are not intended to limit the scope of the invention.

Example 1

Synthesis and Material Characterization

A comparison of two hydrogel systems was conducted. The first system is based entirely on a single SO-anth diblock copolymer, and the other is based on blends of SO-OH diblock and SOS triblock copolymer. The synthesis of the SO-OH diblock copolymer ($f_{PS}$=0.13, $M_n$=70 100 g mol$^{-1}$, PDI=1.05) was carried out using anionic polymerization techniques as described in Guo, C.; Bailey, T. S. Highly distensible nanostructured elastic hydrogels from AB diblock and ABA triblock copolymer melt blends. *Soft Matter* 2010, 6, (19), 4807-4818 (the disclosures of which are incorporated in their entirety). This hydroxyl-terminated SO block copolymer was then used as the precursor for both the SO-anth and SOS block copolymers used in the study.

Figure 2:
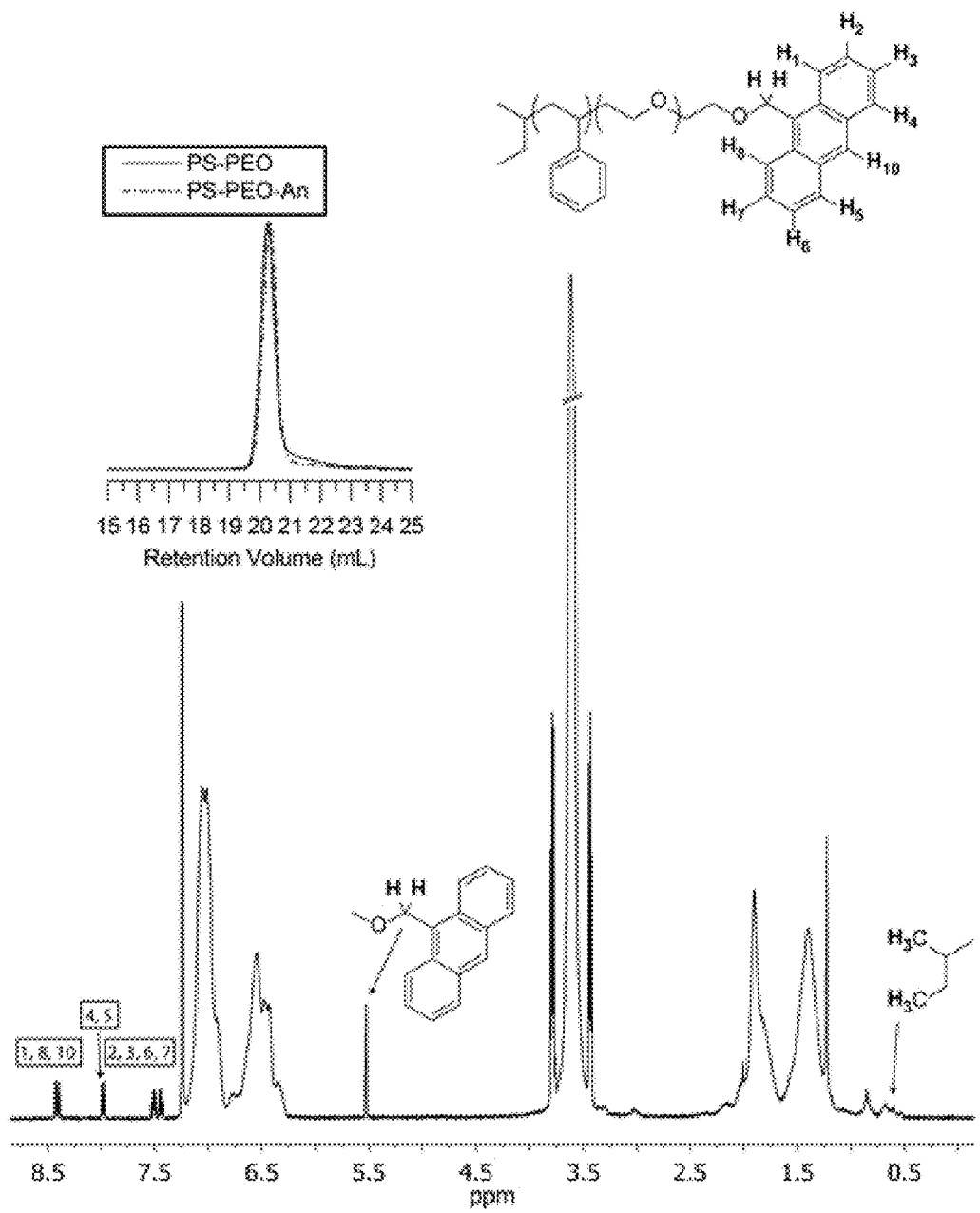
FIG. 2 depicts $^1$H NMR end-group assignments of SO-anth. SEC traces of PS-PEO (SO) and PS-PEO-An (SO-anth) showing near identical molecular weight distributions (inset).

End-functionalization of the SO with anthracene was accomplished through a straightforward nucleophilic substitution reaction with 9-chloromethyl anthracene. The functionality of the end-tagging reaction with anthracene was approximately quantitative within the peak integration resolution of $^1$H NMR (FIG. 2). Analysis by size exclusion chromatography (SEC) confirmed the molecular weight distribution of SO-anth was nearly identical to the parent SO-OH with no evidence of any chain degradation or premature coupling (FIG. 2, inset).

SOS triblock copolymer was produced similarly, through the slow introduction of a bifunctional halide ($\alpha,\alpha$-Dibromo-p-xylene) to the alkoxide form of the SO-OH diblock copolymer precursor. Typical coupling efficiencies for this large chain coupling reaction fall between 80 and 90%, with the balance comprised of unreacted SO-OH diblock copolymer. Pre-blended sample target compositions containing less SOS triblock copolymer than the product of the coupling reaction were prepared by solvent blending with supplementary SO-OH diblock copolymer precursor.

Hydrogel fabrication using the two-component system is achieved using three procedural steps. First, a composition of the SO-OH diblock and SOS triblock copolymer must be selected and homogeneously blended. This is followed by a thermal processing step required to achieve the targeted sphere morphology. Finally, water is introduced to the cooled sample to produce the hydrogel. Using this approach, the ratio of diblock and triblock copolymer fixed in the initial blending step determines the equilibrium water content and mechanical properties of the system. In contrast, hydrogels formed by the one-component SO-anth diblock copolymer can be directly heated for self-assembly, and then irradiated with UV light to achieve any desired ratio of diblock and triblock copolymer, in situ. Once vitrified, water can be introduced to form the hydrogel in the same way as the pre-blended two-component system.

Figure 3A:
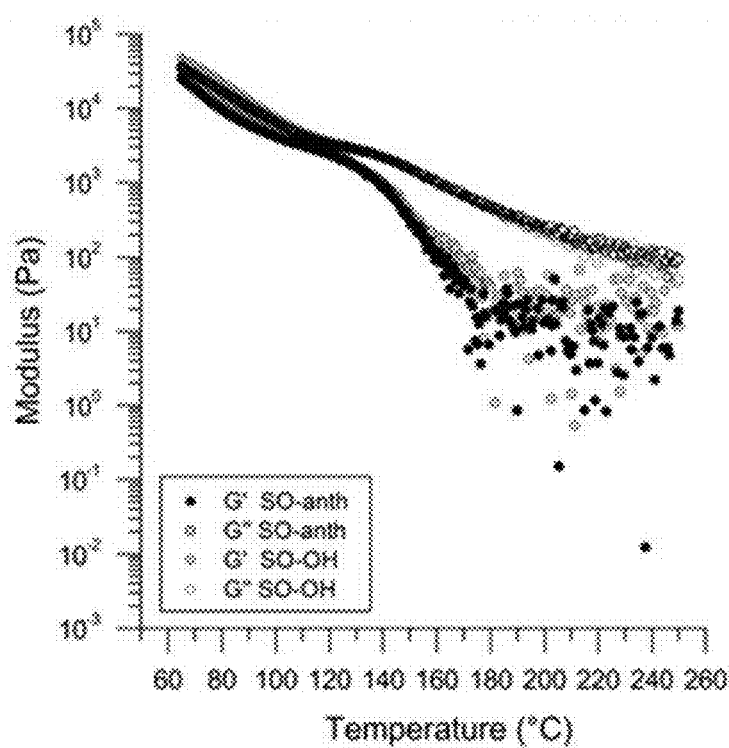
FIGS. 3A-3B.
Figure 3B:
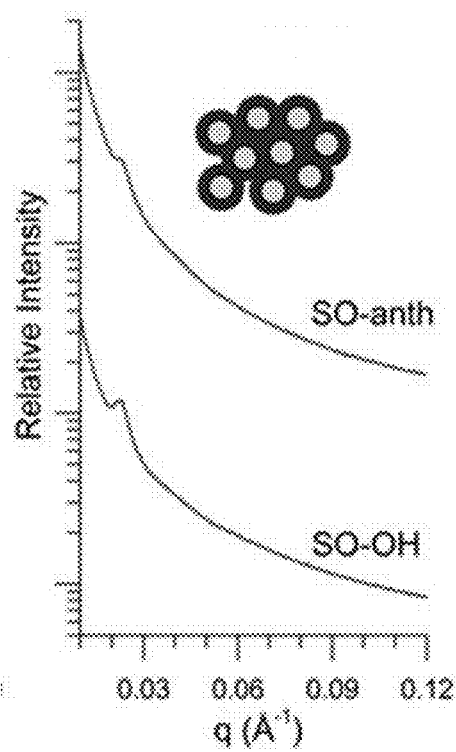

It was verified that the addition of anthracene to the SO chain end would not impact the self-assembly process. Strong interactions among integrated functional groups have been shown to strongly influence morphology, location of thermal transitions, and self-assembly kinetics in some cases. In this case, the morphology of both SO-OH and its modified SO-anth counterpart was confirmed through a combination of dynamic rheology and SAXS. Both samples exhibited near identical melt-state phase behavior, with rheological and scattering signatures prototypical of a phase-separated sphere morphology with liquid-like packing (LLP) (FIG. 3). Isochronal heating under oscillatory shear revealed a steady decrease in moduli upon heating with a larger loss modulus (G") compared to the elastic modulus (G'). This behavior is characteristic of viscoelastic materials with enhanced viscous liquid-like properties. The absence of a plateau response of the moduli and presence of a gradual transition to the disordered state with increased heating is consistent with spherical morphologies with LLP. SAXS data (100° C.) for both SO-OH and SO-anth show primary scattering reflections at 0.0226 Å$^{-1}$ and 0.0230 Å$^{-1}$, respectively, confirming the similarity of the domain spacing in the adopted LLP morphologies. Higher order reflections are absent or severely broadened which is also consistent with phase separated morphologies exhibiting liquid-like packing, a characteristic typical of sphere-forming SO-OH systems of similar molecular weight.

Example 2

Network Installation Through UV Photocoupling of SO-anth in the Melt-State

Figure 5A:
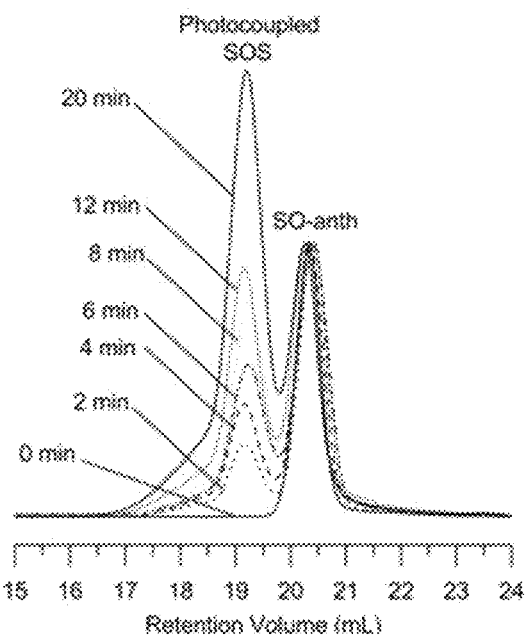
FIGS. 5A-5B.
Figure 5B:
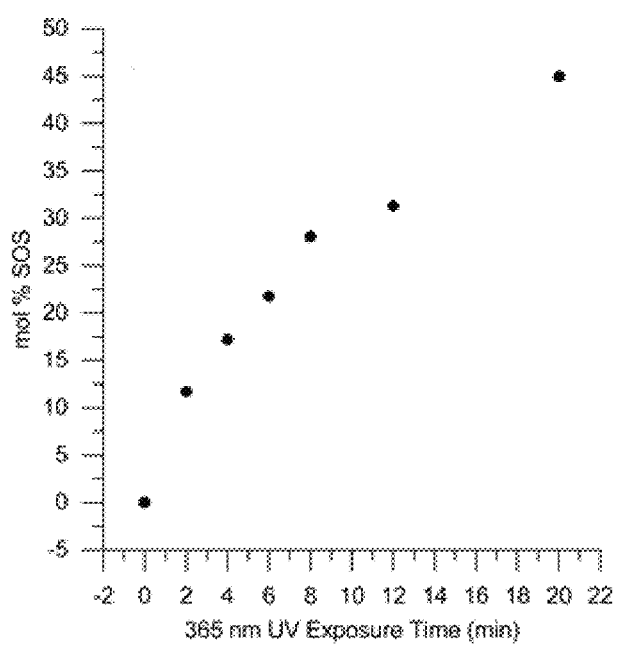
Figure 6A:
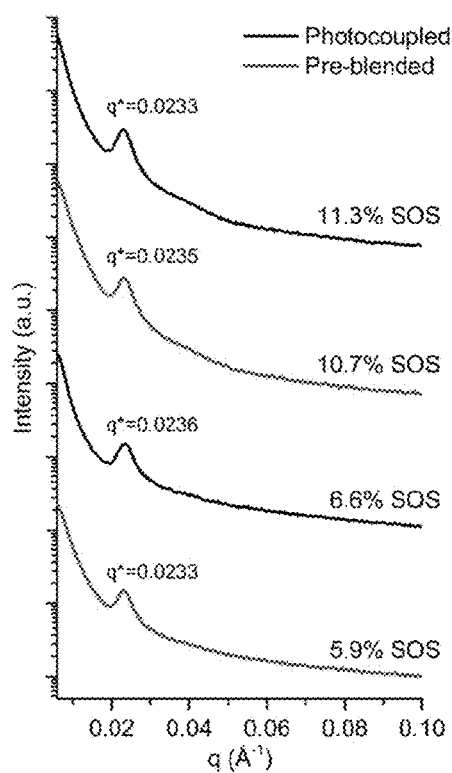
FIGS. 6A-6B.
Figure 6B:
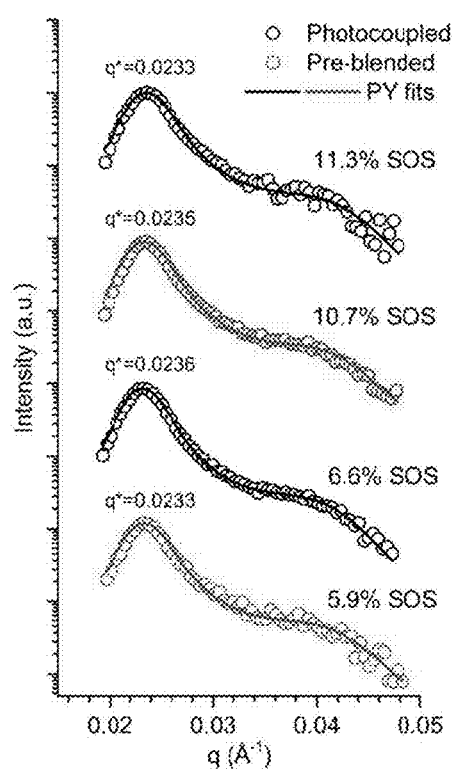
Figure 7:
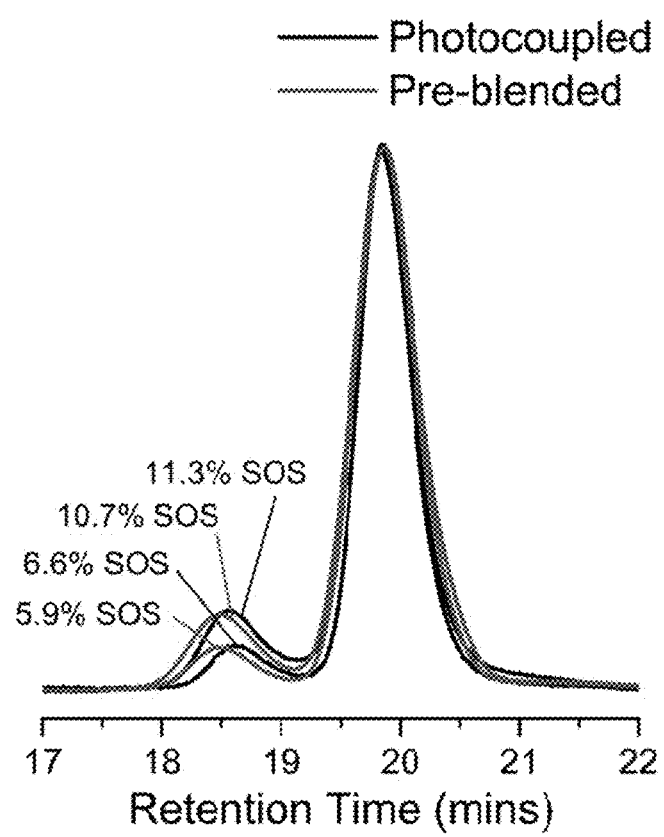
FIG. 7 illustrates that SOS content of SOS 5.9, SOS 6.6, SOS 10.7, and SOS 11.3 was found by use of gel permeation chromatography (GPC).

To begin the hydrogel fabrication process, pre-formed disk-shaped samples of SO-anth block copolymer were placed between surface-treated quartz cover slips or glass slides and heated to 150° C. to removal thermal stress. Samples were then cooled to 100° C. and held in the melt state under argon during exposure to 365 nm UV light (see FIG. 4B-4C). Disks were flipped over halfway through targeted coupling times to ensure axially symmetric exposure. Installed triblock copolymer was correlated with UV exposure time using SEC as depicted in FIG. 5. SEC data confirmed increasing concentrations of SOS triblock copolymer (from 11.7 to 45.0 mol %) were produced with increasing UV exposure times (from 2 to 20 minutes), with the balance being uncoupled SO-anth precursor. Notably, a small but growing shoulder at early elution times indicated the development of high molecular weight species during UV exposure. Without wishing to be bound to any one theory, this may be the result of trace amounts of oxygen-promoted radical coupling despite the use of an argon purge. Regardless, there is a clear and predictable relationship between exposure time and the amount of triblock copolymer formed. Without wishing to be bound to any one theory, this rate is likely influenced by a combination of bimolecular kinetics, light intensity decay with sample depth, restricted chain-end mobility in the entangled melt, and spatially limited reaction volumes due to chain anchoring within the nano structure. In theory, the coupling rate should still also be tunable using the intensity of the incident light used. Importantly, this ability to precisely control the relative amounts of diblock and triblock copolymer with UV light alone greatly simplifies the fabrication protocol; that is, the single parent SO-anth BCP can be used to produce hydrogels with a diverse range tethering densities. A comparison of the LLP morphology (via SAXS model fits, see FIG. 6 and Table 1) between systems in which the SOS triblock copolymer was pre-blended and those in which it was installed through UV-induced chain coupling (as confirmed by SEC in FIG. 7) showed no observable differences, indicating a negligible impact of the UV exposure on the spatial organization of the self-assembled nano structure.

TABLE 1

| Sample | Tether added (mol %) | q*/Å$^{-1}$ | d*/nm | f$_{PS}$ | R$_c^a$/nm | φ$_c^b$ | θ$_{PS}^c$ | R$_{hs}^d$/nm | φ$_{hs}^e$ |
|---|---|---|---|---|---|---|---|---|---|
| SOS 5.9 | 5.9 | 0.0233 | 27.0 | 0.125 | 9.2 | 0.118 | 237 | 15.2 | 0.53 |
| SOS 6.6 (1 min UV) | 6.6 | 0.0236 | 26.6 | 0.125 | 9.2 | 0.116 | 238 | 15.5 | 0.55 |
| SOS 10.7 | 10.7 | 0.0235 | 26.7 | 0.125 | 9.2 | 0.116 | 232 | 15.3 | 0.54 |
| SOS 11.3 (3 min UV) | 11.3 | 0.0233 | 27.0 | 0.125 | 9.1 | 0.118 | 229 | 15.1 | 0.54 |

$^a$Micelle core radius, $^b$Micelle core overall volume fraction, φ$_c$ = (R$_c$/R$_{hs}$)$^3$φ$_{hs}$, based on the PY parameters, $^c$Mean aggregation number (i.e., PS chains per sphere), based on the PY parameters, $^d$apparent hard sphere radius, $^e$hard sphere volume fraction.

The disclosed system utilizing anthracene coupling in the neat melt phase with a BCP of about 70 kDa (very low concentration of end-groups) appears to be controlled and rapid, producing a wide range of coupling efficiencies in less than 25 minutes. Coupling reactions of polymer-bound functional groups can be very fast and efficient in both miscible and immiscible polymer systems if the reactivities of those groups are extremely high (e.g, between anhydride and amine groups). In cases where reactivities are more moderate, the preorganization afforded by directed assembly can enhance coupling or polymerization efficiencies. In this case, without wishing to be bound to any one theory, the micelle-like domain structure (which radially directs the PEO chains toward centralized regions of the matrix), in combination with preferential π-π stacking among terminal anthracene groups, may act to enhance coupling efficiency in these otherwise dilute systems. Importantly, the presently disclosed systems remain processable thermoplastics even after irradiation, being comprised only of SO diblock and photocoupled SOS triblock copolymer species.

Despite the excellent control UV irradiation affords, there appears to be a limitation in the maximum amount of triblock copolymer that can be installed under the conditions used. After roughly 20 minutes of UV exposure, the concentration of triblock copolymer appears to reach a maximum (in this case near 45 mol % SOS). $^1$H NMR shows that, by this point, most anthracene units have been dimerized. However, this fails to be reflected in the amount of triblock copolymer indicated by the SEC data. Without wishing to be bound by any one theory, this apparent discrepancy may be the result of UV-promoted radical cleavage of the anthracene functional unit from the PEO chain end, which depletes the level of triblock copolymer achievable by the system. Notably, cleavage could be occurring prior to, or following, the cycloaddition reaction. This hypothesis is consistent with the retention of the distinct and narrow triblock and diblock copolymer molecular weight distributions in the SEC data. In addition, subsequent radical addition of these byproducts may explain the small high molecular weight shoulder discussed earlier. Finally, because of the absence of the distinct aromatic proton resonances associated with undimerized anthracene in the $^1$H NMR at the point of maximum triblock copolymer concentration, heat or UV-induced retro cycloaddition is not believed to be a contributor to the depletion of triblock copolymer in these systems.

Example 3

Swelling Behavior of UV Photocoupled SO-anth Hydrogels

Once UV exposure is complete and the triblock copolymer tethers have been installed, the samples were simply cooled from the melt to form solid disks. When placed in DI water, these disks were observed to begin swelling immediately, forming hydrogels that reached equilibrium swelling in about 1-2 hours (determined by constant mass and size). Preservation of shape upon swelling was observed (FIG. 5D), as is characteristic of the two-component melt blends studied previously. In this case, some anisotropy in the swelling between the axial and radial directions was detected, suggesting a gradient in triblock copolymer concentration in the axial direction was present. Flipping the disks halfway through their full exposure time ensured this gradient remained symmetric about the axial center. As the concentration of photocoupled triblock copolymer was increased, the amount of swelling decreased in the SO-anth derived hydrogels. This trend in swelling behavior mimics that of systems in which triblock copolymer was pre-blended in specific amounts (FIG. 5A). In general, self-entanglements among tethers, which increase with increasing concentrations of triblock copolymer, act to restrict swelling. The amount of water absorbed, or swelling ratio (g $H_2O$ per g dry polymer, Q), was tunable over the range of 5.7-19.2 depending on the concentration of photocoupled triblock copolymer present within the sample.

Q is about 20% greater in the SO-anth derived hydrogels compared to the pre-blended hydrogels, save for the sample with the highest amount of triblock copolymer studied (45 mol %) where the swelling is nearly identical. In order for the SO-anth to photocouple with UV light, two anthracene functional chain ends must meet within a defined reaction volume in which one of the anthracene units is in a short-lived photoexcited state (nanoseconds). The probability of photocoupling increases with UV flux, and therefore coupling within the melt-disk (0.29 mm thick) will be most efficient at the surface and least efficient in the axial center due to being flipped over halfway through irradiation time. This depth-dependent photocoupling efficiency should inherently produce an axial gradient in triblock copolymer concentration with a minimum at the center of the vertical axis. The moderate swelling ratio increase exhibited in photocoupled hydrogels appears to be a direct result of greater swelling in this less densely tethered axial center. This is in contrast to the pre-blended samples (regardless of thickness) for which a statistically homogenous distribution of triblock copolymer produces homogeneous swelling throughout the entire depth of the hydrogel. Notably, there does appear to be a similarity in swelling between the sample with the longest exposure time (20 minutes, 45% triblock copolymer) and its corresponding pre-blended sample, as mentioned earlier. It is hypothesized that as irradiation time increases, the gradient in tether concentration is diminished as total intensity required to maximize coupling conversion at each depth is reached. Interestingly, the ability to purposefully create an axial gradient of entanglements naturally produces a surface skin layer (tighter mesh size) while retaining a more porous subsurface region. In this way, the disclosed hydrogels intrinsically mimic the structure of phase inversion membranes in which such a skin layer is used to dictate transport rates. As such, the self-assembled SO-anth system provides the foundation for an alternate class of block copolymer-based nanoporous materials; one in which the concentration dependent mesh size produced by the installed triblock copolymer, rather than the void space produced by selectively etching away a specific block, is used to define the division of pore space in the system.

Example 4

Swelling Behavior of UV Photocoupled SO-anth Hydrogels

Figure 8:
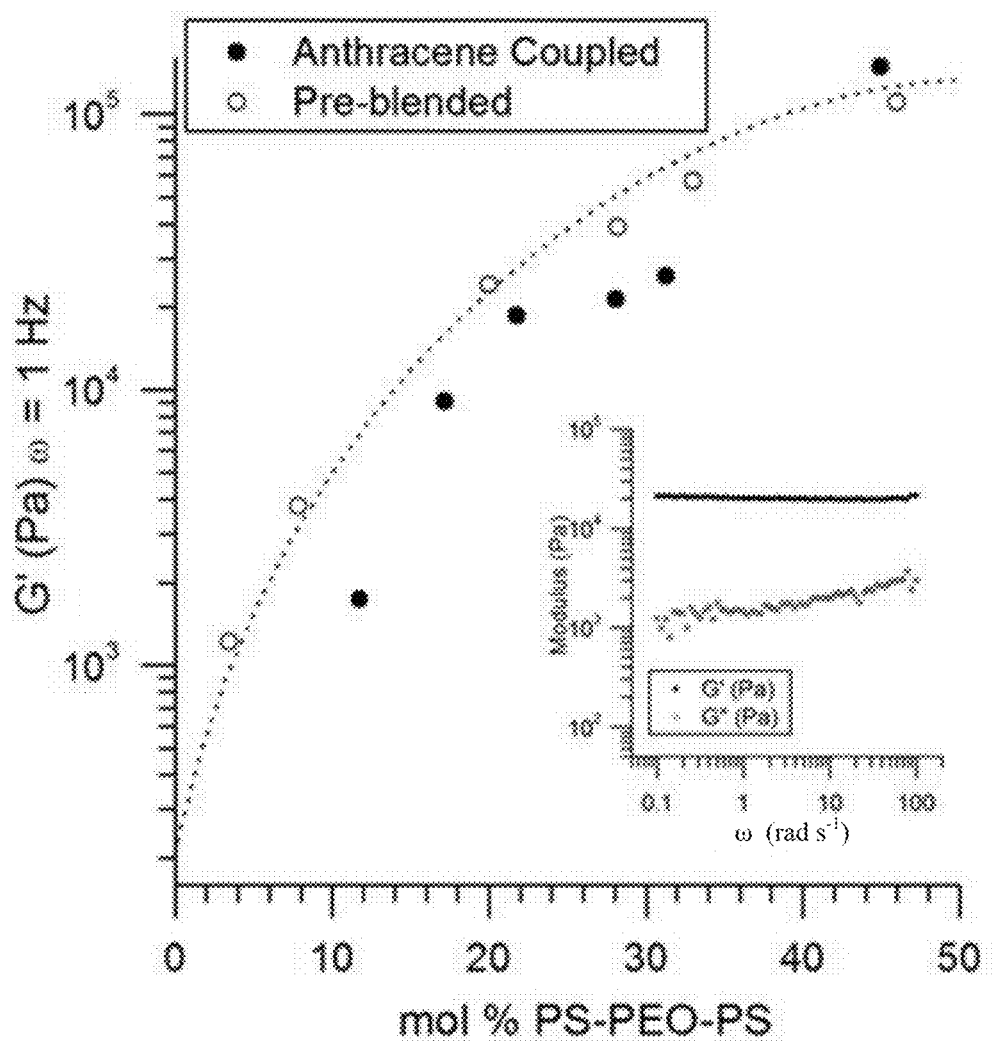
FIG. 8 shows elastic modulus of pre-blended SO/SOS and photocoupled SO-anth hydrogels taken at 1 rad s$^{-1}$ from room temperature dynamic frequency sweeps performed over frequencies of 0.1-100 rad s$^{-1}$ in the linear viscoelastic regime (ε=0.1-1%). The dashed line serves as a visual reference showing the typical elastic moduli of pre-blended two-component hydrogels. Inset: Dynamic frequency sweep of SO-anth hydrogel that has been UV photocoupled for 8 min (28.1 mol % triblock copolymer). The plateau response is representative of these hydrogels at all triblock copolymer concentrations and prototypical of highly elastic solids.

To compare the mechanical response of the one- and two-component systems, their behavior under dynamic shear and unconfined compression was examined. Dynamic frequency sweeps over a range of 0.1-100 rad s$^{-1}$ yielded a plateau-like response in elastic modulus for all hydrogels in both systems. FIG. 8 contains the elastic moduli (G') at 1 rad s$^{-1}$ extracted from these frequency sweeps, plotted as a function of mol % triblock copolymer. As the triblock copolymer concentration increases for both systems, the modulus also increases. This behavior has been shown to be a product of increased overlap among the individual micellar domains, due to increasing entanglements in the tether population. However, it appears that installation of the triblock copolymer through anthracene photocoupling produces elastic moduli slightly lower than those obtained in pre-blended samples at similar triblock copolymer concentrations. Without wishing to be bound by any one theory, this may be because the tether concentration in the axial center of the hydrogel is lower in photocoupled samples versus those that were pre-blended. Such a reduced tether concentration in the center was consistent with the higher degree of swelling, and would translate mechanically as a softer, more deformable core under oscillatory shear. In contrast, the two-component TPE hydrogel, with a statistically homogenous distribution of triblock copolymer throughout, exhibits higher overall modulus values in shear. Of note, the sample with the highest concentration of photo-installed triblock copolymer (45 mol %) exhibits a very similar elastic modulus to the analogous pre-blended sample, consistent with the hypothesis that such a gradient is reduced at longer (over 12-minute) UV exposure times.

Importantly, tunability in the triblock copolymer concentration using 365 nm light irradiation enables direct and facile control of hydrogel mechanical properties. That is, accessible exposure times (between 2 and 20 minutes) can produce elastic moduli spanning two orders of magnitude ($10^3$-$10^5$ Pa), a direct consequence of the ability to prescribe a chosen concentration of installed triblock copolymer.

Figure 9:
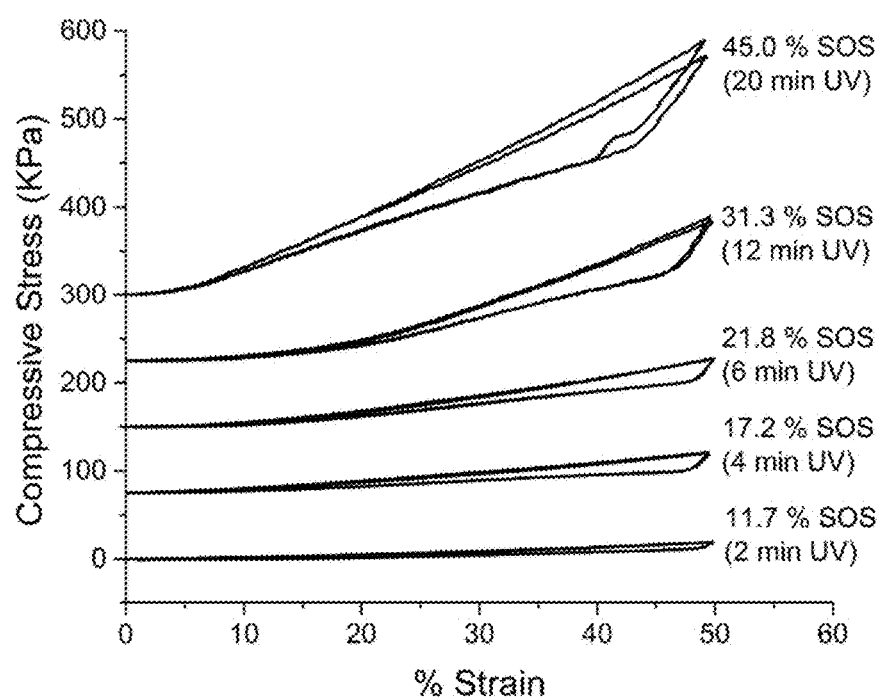
FIG. 9 shows compressive stress vs. strain data for two complete compression cycles of photocoupled SO-anth hydrogels with varying installed triblock copolymer content, artificially spaced for visual clarity. Each curve is labeled with the mol percent triblock copolymer and the associated UV exposure time.
Figure 10:
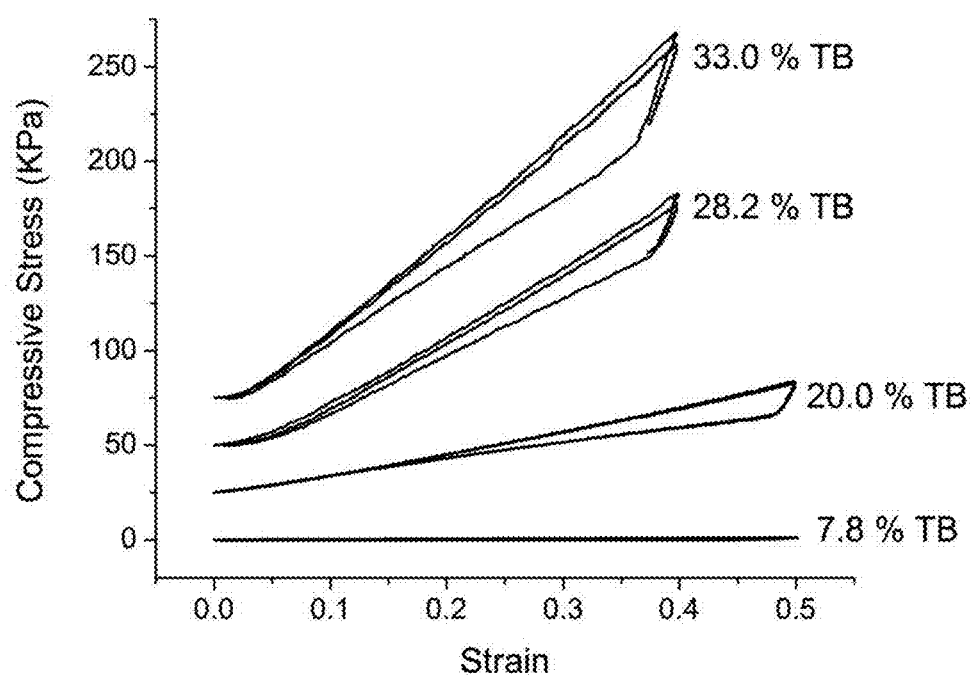
FIG. 10 shows two cycles of unconfined compression data (50% strain at 2% s$^{-1}$) over two successive cycles on pre-blended samples of various SOS content (PS-PEO-PS/PS-PEO).

The mechanical behavior of the photocoupled SO-anth hydrogels was further investigated by evaluating the stress-strain behavior under unconfined compression. Samples containing various installed triblock copolymer concentrations were compressed to 50% strain (2% $s^{-1}$) over two successive cycles as shown in FIG. 9. In general, all samples showed a small degree of recoverable hysteresis upon removal of the stress, such that each second cycle replicates the initial stress-strain behavior nearly identically (FIG. 9 and FIG. 10). The reproducibility demonstrated by the second cycle implies the origin of the hysteresis is from rate dependent elastic recovery, which is associated with diffusion limitations of the water distributed within the material and not any permanent network deformation or damage. These results imply the photocoupled hydrogel systems possess excellent fatigue resistance.

An interesting feature of the compression data for the photocoupled samples is the distinct change in slope at a critical strain value for each sample. This change in slope defines a low-modulus toeing region at early strain values followed by a region of much stronger strain dependence (higher modulus). The strain range of this early toeing behavior clearly decreases with increasing triblock copolymer content. Again, it appears that there is a strong correlation between the strain range over which the sample is easily deformed and UV exposure time. Without wishing to be bound by any one theory, it appears that the lower concentration of tethering molecules at the axial center at shorter exposure times produces a softer core is consistent with this clear trend in toeing behavior under compressive strains. At the inflection point, the softer center region has been significantly compressed such that the material modulus begins to reflect that characteristic of the more densely tethered outer regions of the hydrogel. In agreement with this assertion is the clear correlation between increasing modulus and overall triblock copolymer content in this region. Notably, at short UV exposure times, the distinction between the two regions becomes difficult to discern due to the low overall triblock copolymer content at any depth in the sample.

Figure 11:
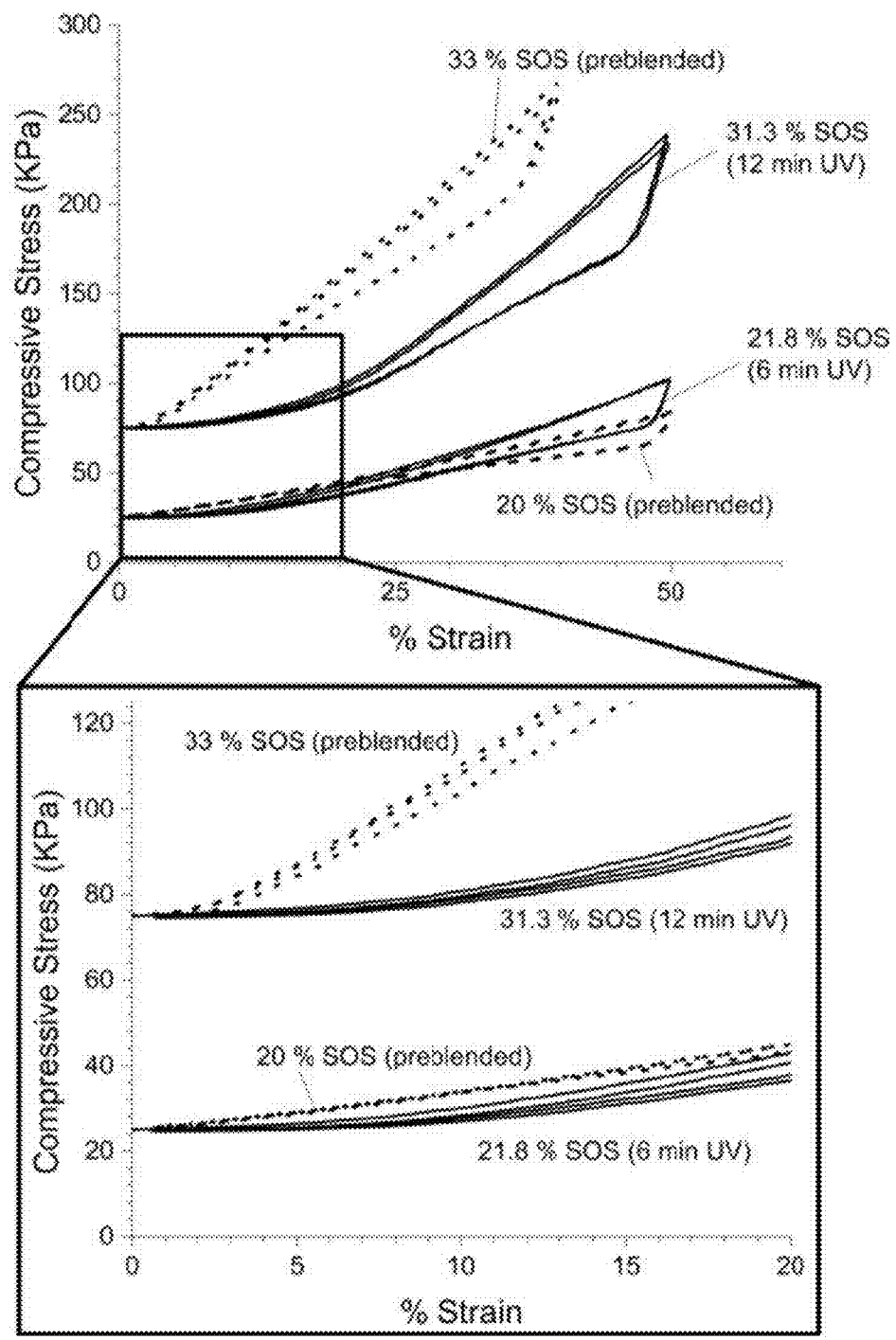
FIG. 11 depicts a comparison of compressive stress vs. strain data between two sets of pre-blended and photocoupled samples of similar triblock content with an enlarged view of toeing region (artificially spaced). Graduated installation of triblock copolymer through UV photocoupling allows for the integration of toeing behavior, which is not possible in pre-blended systems due to homogeneously distributed tethering.

To investigate that the reduced toeing region is in fact related to a diminished gradient in triblock copolymer concentration, these compression data were directly compared to pre-blended hydrogels in which the triblock copolymer distribution is statistically homogeneous. Toeing in such samples has been shown to be minimal. To evaluate the difference in toeing behavior between these two systems, compression data for the samples at two similar concentrations of triblock copolymer are juxtaposed in FIG. 11. The comparison immediately reveals that the homogeneous distribution of tethers in the pre-blended samples virtually eliminates the toeing behavior, with pre-blended samples adopting a constant modulus at much lower strain values than that of their photocoupled counterparts of similar triblock copolymer content.

Figure 12:
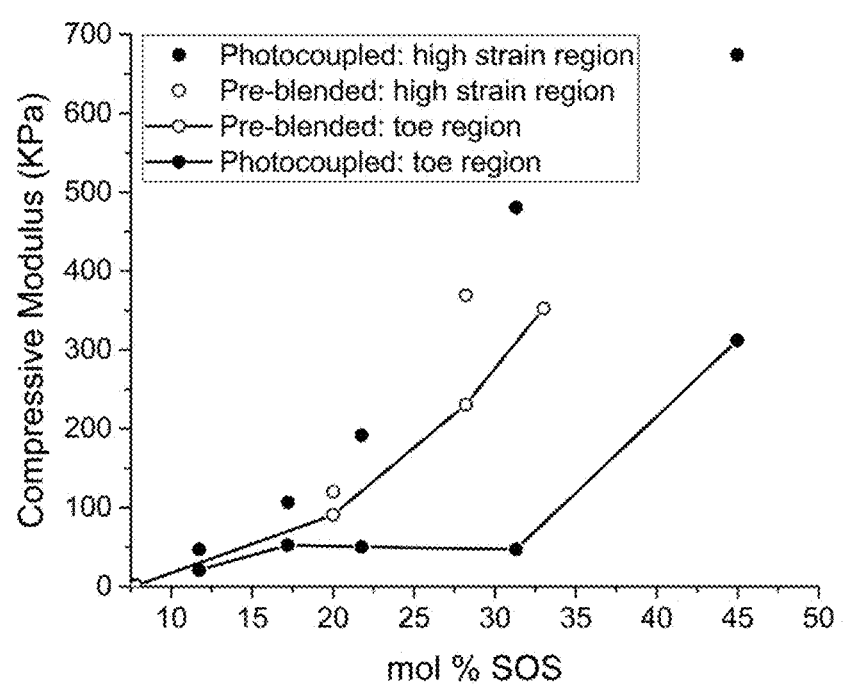
FIG. 12 depicts a comparison of compressive moduli between photocoupled and pre-blended gels as a function of triblock content in toe (ε=0-0.1) and high strain (ε=0.2-0.3) regions. Lines connecting toeing region data are added for clarity only.

FIG. 12 depicts the first cycle compressive moduli for both pre-blended and photocoupled hydrogels in the higher strain region as function of the overall triblock copolymer content. This plot emphasizes two key distinctions between this pair of hydrogel systems. First, the average triblock copolymer content is ultimately a fairly good predictor of the higher-strain modulus in both materials. Second, the toeing region modulus of the photocoupled samples stays largely independent of triblock copolymer content until higher triblock copolymer concentrations (therefore reduced axial gradients) are reached. Uniquely, the graduated distribution of tethers intrinsic to the UV installation mechanism provides a means of integrating toeing behavior that is otherwise absent from classic TPE hydrogel systems. Such toeing behavior is common in a range of hydrated soft tissues and a key characteristic often critical to their physiological function and biomechanical performance. As such, the integration of phototunability into this basic TPE hydrogel framework extends their utility as important materials in soft tissue repair applications.

Experimental for Examples 1-4

Materials and Methods

Styrene (99%, 50 ppm p-tert-butylcatechol inhibitor, Aldrich) was purified by static vacuum (15-30 mTorr) distillations from di-n-butylmagnesium (1.0 M in heptane, Aldrich) at 40° C. Ethylene oxide (99.5+%, compressed gas, Aldrich) was purified by successive distillations from di-n-butylmagnesium (1.0 M in heptane, Aldrich) at 3° C. sec-butyllithium (1.3 M in cyclohexane/hexane, Fisher) was used as received. Potassium naphthalenide solution was prepared according to Guo, C.; Bailey, T. S. Highly distensible nanostructured elastic hydrogels from AB diblock and ABA triblock copolymer melt blends. *Soft Matter* 2010, 6, (19), 4807-4818 (the disclosures of which are incorporated in their entirety). 9-(chloromethyl)anthracene (98%, Aldrich) and α,α-dibromo-p-xylene (97%, Aldrich) were dried under high vacuum for several hours prior to use. Tetrahydrofuran (THF) was degassed by sparging with argon (10 psi) for a period of 45 minutes and then purified over two molecular sieve columns of neutral alumina (Glass Contour, Inc.). Cyclohexane (CHX) was degassed with argon and purified through a column of neutral alumina followed by a column of Q5 copper (II) oxide catalyst (Glass Contour, Inc.). Hydrogels were swollen using DI water of 18.2 MΩ resistivity (Evoqua/U.S. Filter Service Deionization). Other common chemicals and solvents were used as received unless otherwise stated. Ultra high purity argon (99.998% Airgas) was passed through a column of 5 Å molecular sieves with drierite (Agilent) and oxygen absorbing purifier column (Matheson Tri-gas). Glassware and polymerization reactors were flamed under vacuum and backfilled with argon (3×).

Measurements $^1$H NMR spectra were recorded at room temperature on a Varian Inova 400 MHz spectrometer with a d1 pulse delay of 20 s to ensure complete relaxation of end-groups. Spectra were referenced to the residual protio solvent, CHCl$_3$. Size exclusion chromatography (SEC) spectra were collected on a Viscotek GPC-Max chromatography system outfitted with three 7.5×340 mm Polypore™ (Polymer Laboratories) columns in series, a Viscotek differential refractive index (RI) detector, and an Alltech column oven (mobile phase THF, 40° C., 1 mL min$^{-1}$). Rheological melt experiments were run on a TA Instruments Advanced Rheometric Expansion System (ARES) rheometer. Copolymer samples for melt rheology were pressed as solid disks (8×1 mm, 150° C., 500 psi for 60 s). Disks were positioned between two parallel plates (8 mm diameter). The rheometer parallel plates were heated to 75° C. and the gap was reduced and adjusted to ensure even distribution of the sample (typical gaps were 0.5-0.7 mm). Dynamic temperature ramp tests were performed while heating and cooling at 1° C. min$^{-1}$ at angular frequency of 1 rad s$^{-1}$ and a strain of 5% (well within the linear viscoelastic regime, determined by dynamic strain sweep experiments for each copolymer). Rheological swollen hydrogel frequency sweep and compression experiments were run at room temperature using an infinite stainless steel (63 mm) lower plate and an 8 mm stainless steel upper parallel plate. Before starting the rheological experiments, hydrogels were blotted dry with KimWipes and humidity covers were placed over the water bath to prevent evaporation. A constant force was applied (10% compression) to all hydrogel samples to prevent slip. Strain rates were adjusted depending on the linear viscoelastic regime (typically 0.1-1%). Small Angle X-ray Scattering (SAXS) data were collected on a Rigaku S-Max 3000 High Brilliance three pinhole SAXS system outfitted with a MicroMax-007HFM rotating anode (CuKα), Confocal Max-Flux™ Optic, Gabriel multiwire area detector, and a Linkam thermal stage. Dry polymer samples were sandwiched between kapton windows (0.05 mm thick×10 mm diameter). Exposure times for samples were typically on the order of 3600 s.

Synthesis of PS-PEO (SO) and PS-PEO-PS (SOS)

Hydroxyl terminal polystyrene-b-poly(ethylene oxide) (PS-PEO, SO) was synthesized according to Guo, C.; Bailey, T. S. Highly distensible nanostructured elastic hydrogels from AB diblock and ABA triblock copolymer melt blends. *Soft Matter* 2010, 6, (19), 4807-4818 (the disclosures of which are incorporated in their entirety) using two-step anionic polymerization of styrene and ethylene oxide monomer. In brief, step one involved the synthesis of a hydroxyl-terminal polystyrene macroinitator ($M_{n,PS}$=8,390 g mol$^{-1}$, $M_{w,PS}/M_{n,PS}$=1.03, SEC (polystyrene standards)), from which the final SO-OH diblock copolymer was produced. The volume fraction of the PS block in the final diblock copolymer was determined to be 0.13 (using nominal densities at 140° C.) with an overall $M_n$=70,100 g mol$^{-1}$ ($M_{w,SO}/M_{n,SO}$=1.04. SEC (polystyrene standards)) calculated using the measured $M_{n,PS}$ and the relative $^1$H NMR integrations. The synthesis of triblock PS-PEO-PS for the pre-blended samples was accomplished via coupling using α,α-dibromo-p-xylene (1 equiv of PS-PEO: 0.5 equiv of α,α-dibromo-p-xylene). In general coupling reactions using α,α-dibromo-p-xylene yield coupling efficiencies in the 70-90 mol % range, with the balance material being uncoupled SO-OH diblock copolymer.

Synthesis of PS-PEO-anthracene (SO-anth)

PS-PEO (1.16 g, 0.017 mmol) was dissolved in 100 mL dry THF. The solution was slowly titrated with potassium naphthalenide such that the solution remained light green for at least 20 min. A large excess of 9-(chloromethyl)anthracene (0.113 g, 0.5 mmol, ~30× excess) was then immediately added to the PS-PEO alkoxide solution under a slight positive pressure of argon at room temperature. The solution was allowed to stir overnight under argon. The anthracene terminated block copolymer product was precipitated from 25° C. pentane (1 L) twice. Filtration and drying in vacuo (25° C., 24 h) gave the block copolymer as an off-white powder. Yield=0.96 g (83%). SEC (polystyrene standards): $M_w/M_n$=1.04. $^1$H NMR (400 MHz, CDCl$_3$, δ): 8.4-8.5 (m, anthracene H$_1$, H$_8$ and H$_{10}$), 7.9-8.0 (d, anthracene H$_4$ and H$_5$), 7.4-7.6 (m, anthracene H$_2$, H$_3$, H$_6$ and H$_7$), 6.2-7.2 (b, —CH$_2$—C(R)H—C$_6$H$_5$), 5.5 (s, —O—CH$_2$-anthracene), 3.4-3.8 (b, —CH$_2$—CH$_2$—O—), 1.1-2.3 (b, —CH$_2$—C(R)H—C$_6$H$_5$), 0.8-0.9 (b, CH$_3$—CH$_2$—C(R)H—CH$_3$), 0.5-0.7 (b, CH$_3$—CH$_2$—C(R)H—CH$_3$). See FIG. 2 for clarification of anthracene proton assignments. Relative integrations of anthracene to initiator protons suggest a quantitative addition within $^1$H NMR integration error (~5%).

Preparation of Blended SO/SOS Samples

SO/SOS blends were produced by solution blending (0.2 g total polymer per mL CHCl$_3$ or benzene) the appropriate amounts of SO-OH diblock copolymer and the SOS coupling product to reach the specified molar concentrations of triblock copolymer. Solutions were made in small glass vials and frozen using an ethanol/liquid N$_2$ slush bath, then placed in vacuo (10-20 mTorr) at room temperature for at least 24 hours. Removal of solvent was confirmed by $^1$H NMR. 8.14 mm diameter 0.29 mm thick disks were melt pressed (Carver Press) directly from powders using a stainless steel cutout sandwiched between Teflon covered kapton sheets. Disks were held under a constant pressure of 500 psi at 150° C. for approximately 60 s, before being removed from the press and cooled (unassisted) to room temperature. The formed polymer was easily removed from the stainless steel cutout to give homogeneous, slightly opaque (due to PEO crystallinity), disks. Disk dimensions (diameter and thickness) and dry weight were recorded for subsequent swelling experiments.

UV Photocoupling SO-Anth in the Melt Phase

SO-anth for the photocoupling experiments were pressed as solid disks (8.14×0.29 mm, 150° C., 500 psi for 60 s) and stored in the dark before use. The copolymer disk was sandwiched between two quarts cover slips (0.25 mm thickness). The quartz cover slips were pre-treated in a solution with 10:1 volumetric ratio of toluene:trimethylchlorosilane overnight prior to use to make the surface hydrophobic. Immediately before use, the quartz cover slips were rinsed with ethanol to remove any excess solution. The SO-anth disk sandwiched between the quartz slides were placed on a hotplate and heated to 150° C. for 1 min and cooled to 100° C. (5 min cooling time) under a purge of argon. A TA Instruments ARES quartz parallel plate with reflecting mirror tool was positioned approximately 1-2 mm above the surface of the sample. A Hamamatsu Lightning Cure LC8 UV spot cure system was utilized with a 200-Watt mercury-Xenon lamp, Asahi Spectra Co high transmission Band pass 365 nm filter, synthetic silica light guide and short focal point condenser lens. The light guide was positioned approximately 1 cm from the quartz reflecting mirror. The intensity at the surface of the sample was 30-38 mW cm$^{-2}$ (measured in the range of 200-600 nm with an Omnicure R2000 Radiometer). Samples were exposed to UV 365 nm filtered light for 2-20 min and flipped over halfway through the exposure time. The formed polymer was easily removed from the quartz cover slips to give homogeneous, slightly opaque (due to PEO crystallinity) disks. Disk dimensions (diameter and thickness) and dry weight were recorded for subsequent swelling experiments.

Example 5

Synthesis and Starting-Material Characterization

Figure 13:
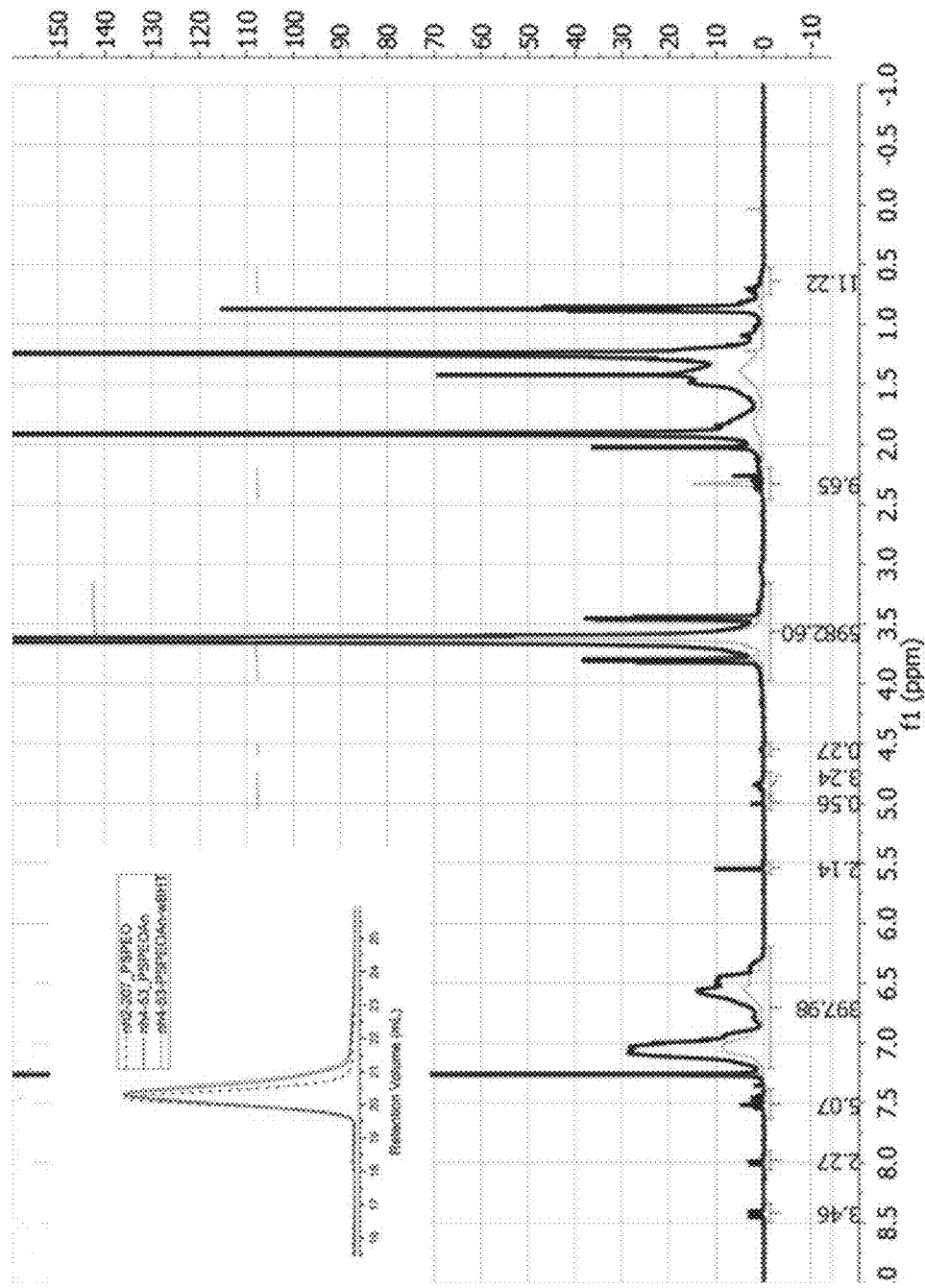
FIG. 13 is a $^1$H nuclear magnetic resonance (NMR) spectrum of SO-anth and precursors. Inset—molecular weight distribution of the SO-anth product was confirmed using size exclusion chromatography (SEC), with and without BHT.

As in Examples 1-4, the synthesis of the SO-OH diblock copolymer ($f_{PS}$=0.122, $M_n$=73800 g mol$^{-1}$, PDI=1.04) parent to the SO-anth was carried out using anionic polymerization techniques as described previously, and end-functionalization of the SO with anthracene was accomplished using a nucleophilic substitution reaction of the hydroxyl end-group using 9-chloromethyl anthracene. The anthracene functionality was estimated to be approximately quantitative using $^1$H nuclear magnetic resonance (NMR) peak integrations (FIG. 13). The molecular weight distribution of the SO-anth product was confirmed using size exclusion chromatography (SEC) and resembled that of the parent SO-OH, indicating no evidence of chain degradation, and a small amount of premature coupling from inadvertent light exposure during regular handling (FIG. 13, inset).

Precursor SO-OH diblock copolymer molecular weight and polystyrene volume fraction were chosen based on the previous work done on the SO-anth building block model studying melt-state tethering. This allows for a basis of comparison between systems due to the similar size and self-assembly behavior, and provided a way to study the building blocks used in both systems, which may further elucidate tendencies reported in the melt-state system that may have been overlooked due to limitations of studying the system in the more entangled dry state.

This SO-anth product is the sole component of this solution-based pourable hydrogel fabrication method. The process involves three steps. First, the polymer is self-assembled in the melt to form spherical micellar structures of a hydrophobic poly(styrene) core and a poly(ethylene oxide)-anthracene corona. Next, these photoactive micelles are combined with water in specific ratios to form solutions of varying viscosity and micelle concentration (and thus distance). Finally, these micelle solutions can be poured or smeared into molds, or shaped by hand (depending on solution viscosity) and photocoupled using UV light ($\lambda$=365 nm, I=~30 mW cm$^{-2}$). This exposure causes dimerization of the anthracene end groups, creating tethers between micellar building blocks to create a network. The resulting thermoplastic elastomer soft hydrogel can then be placed in water to swell to its equilibrium dimensions.

Example 6

Melt-State Self-Assembly of SO-Anth Micelles and their Characterization

An important aspect of this work was to closely examine the melt-state self-assembly step used in both melt-state (dry) and solution-based tethering systems to improve our understanding of the role the physical spacing and chain interactions between the micelle building blocks has on mechanical property control. Such information has the potential to more accurately guide/focus the development and refinement of these materials for useful applications.

Figure 14A:
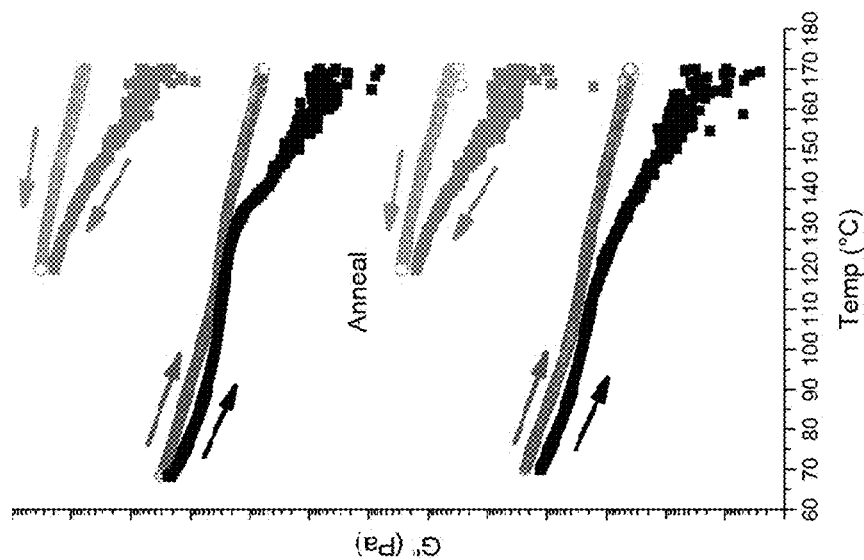
FIGS. 14A-14B shows the rheological temperature ramps of SO-OH (FIG. 14A) and SO-anth (FIG. 14B), before (lower half) and after (upper half) annealing in the SAXS. Solid circles indicate storage moduli (G') and open circles are loss moduli (G").
Figure 14B:
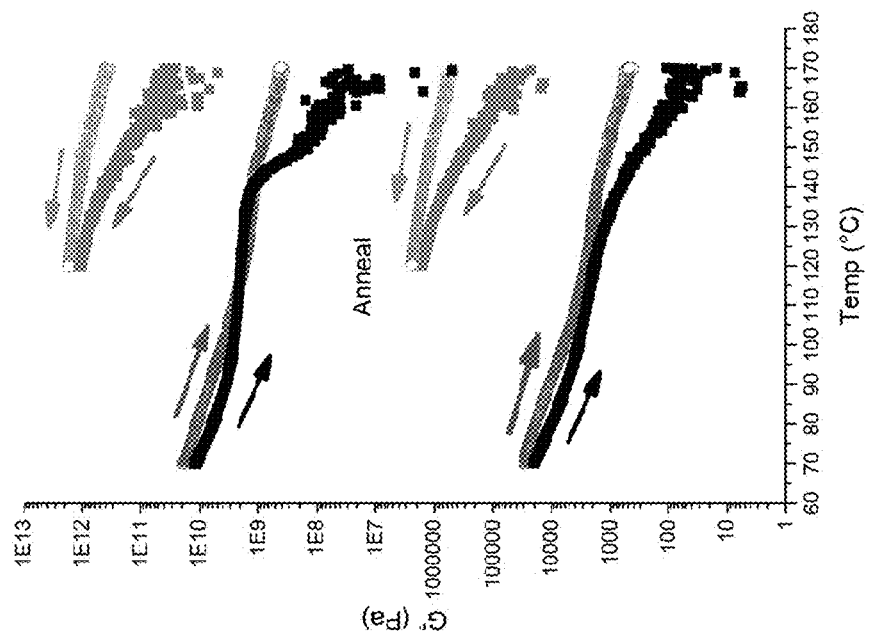
Figure 15A:
FIGS. 15A-15C.
Figure 15B:
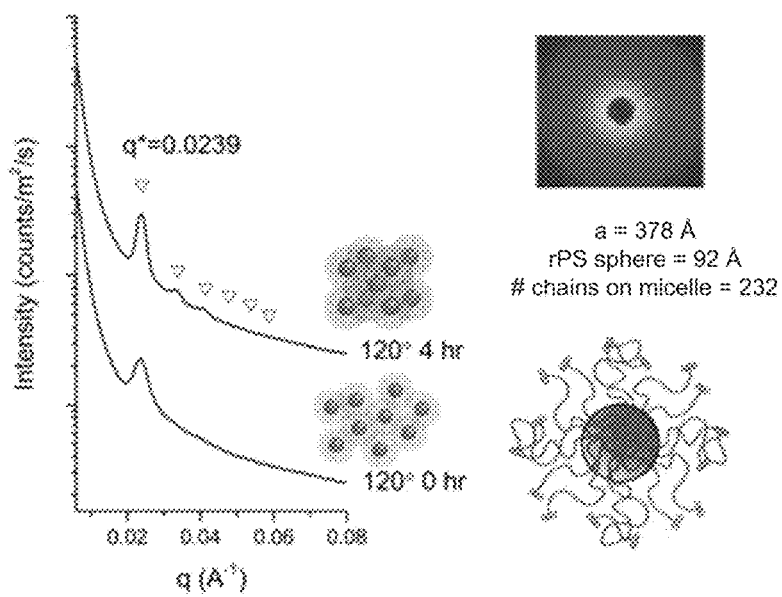
Figure 15C:
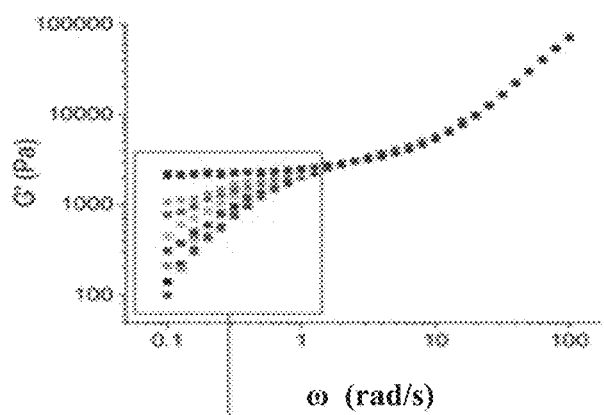
Figure 15C:
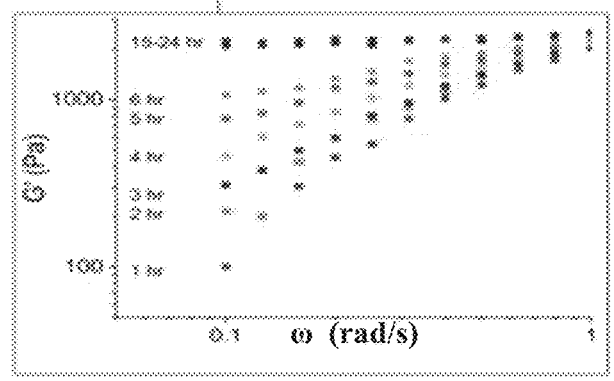
Figure 16A:
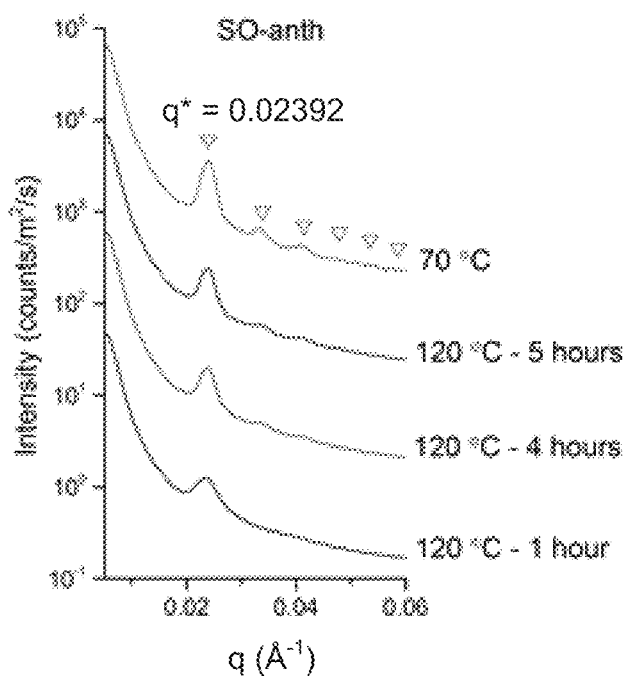
FIGS. 16A-16B show SAXS annealing and cooling of SO-anth (FIG. 16A) and SO-OH (FIG. 16B).
Figure 16B:
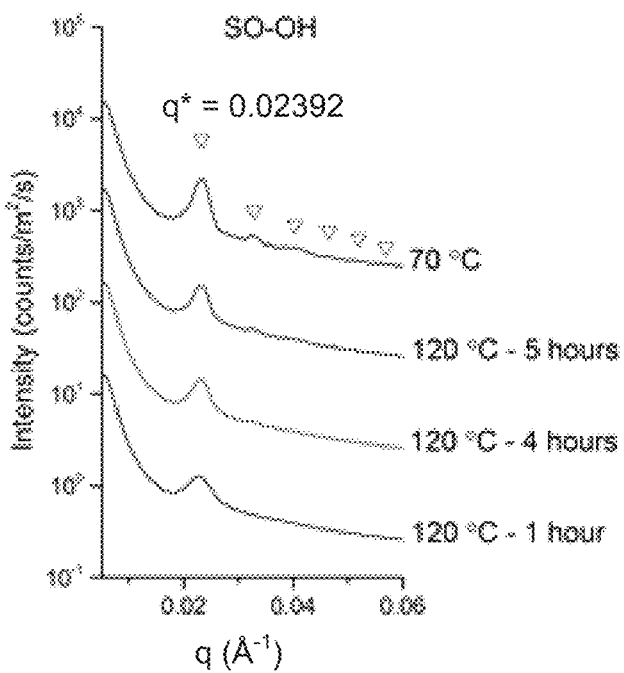

SAXS was used to determine whether addition of the anthracene functionality affected the traditional SO diblock copolymer system. To do this, the temperature range in which the transitions from LLP or BCC to disorder was identified using a rheological temperature ramp. There was a decrease in elastic modulus between 110 and 140° C., indicating the disordering transition (FIG. 14). Following this step, the samples were heated to disorder in the SAXS, and then cooled to 120° C. to anneal. Evidence of a transition from LLP to BCC packing of spheres can be seen in the SAXS data for SO-anth between 3 and 4 hours (FIG. 15). This was checked against the SO-OH precursor to ensure addition of anthracene did not affect self-assembly behavior (FIG. 16). SO-OH seems to adopt BCC structure only slightly faster than SO-anth, possibly due to the lack of the hydrophobic end groups which may, in the case of the anthracene-terminated diblock copolymer chains, slow down or limit adoption of clearly segregated domains. This result was then checked using a rheological frequency sweep under oscillatory shear ($\omega$=1 rad s$^{-1}$, $\dot{T}$=120° C. min$^{-1}$, $\epsilon$=7%), during which it was found that a plateau in G' was reached by 15 hours (FIG. 15).

Example 7

Fabrication of Micelle Solutions and their Characterization

Figure 17A:
FIGS. 17A-17C. Self-assembled micelles are introduced to water to form a viscous solution (FIG. 17A). Micelle stability and behavior in water was monitored over 9 weeks using DLS, during which there was no evidence of aggregation (FIG. 17B). Cryo-TEM confirmed this result (FIG. 17C).

To form solutions of free micelles, de-gassed DI water was added to the self-assembled SO-anth spheres in specific relative quantities. The relative amounts of water and polymer in these solutions are referred to in this study as the swelling ratio (Q, g water per g polymer). Upon introduction to one another, mixtures of water and polymer were left for a time in order for the polymer to soften, and then were vortexed for proper dissolution. They were then allowed to settle into viscous, yellow-tinged clear solutions (FIG. 17A).

Even though a BCC structure is only achieved after prolonged annealing as shown in FIG. 15, DLS data on solutions containing annealed vs un-annealed samples shows no significant difference in size distribution, precluding the need to wait for the full BCC structure to form. This greatly shortened the self-assembly processing step in this hydrogel fabrication process.

Figure 17B:
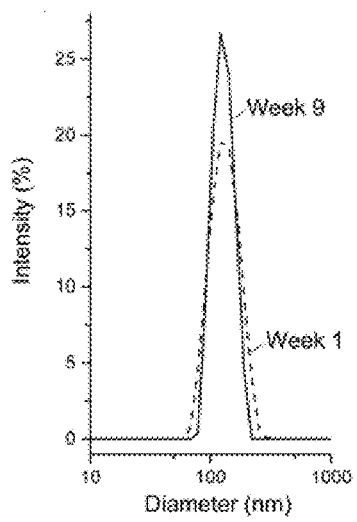
Figure 18B:
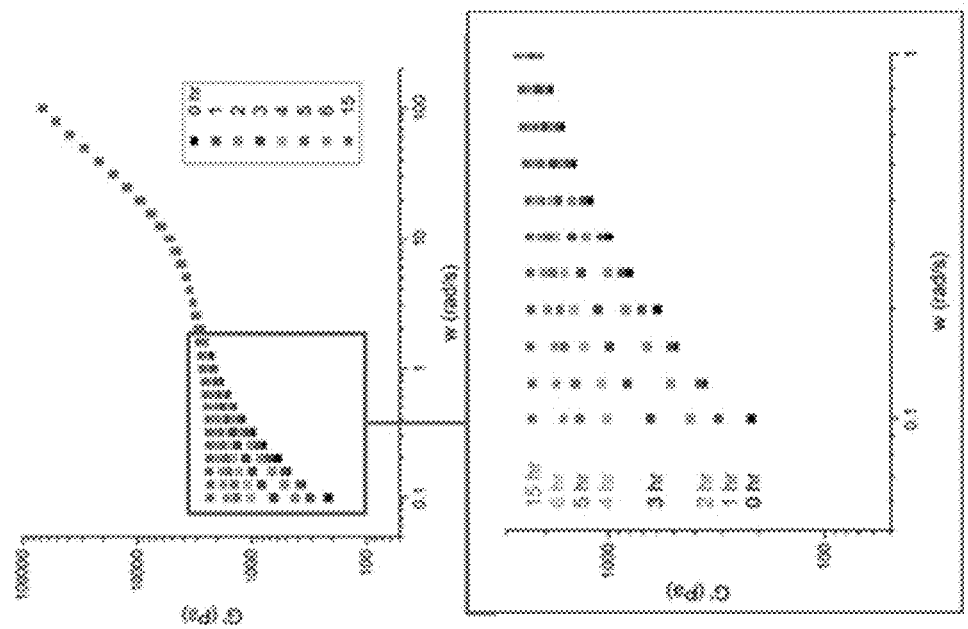
FIGS. 18A-18B show annealing rheology of SO-OH (FIG. 18A) and SO-anth (FIG. 18B).
Figure 18A:
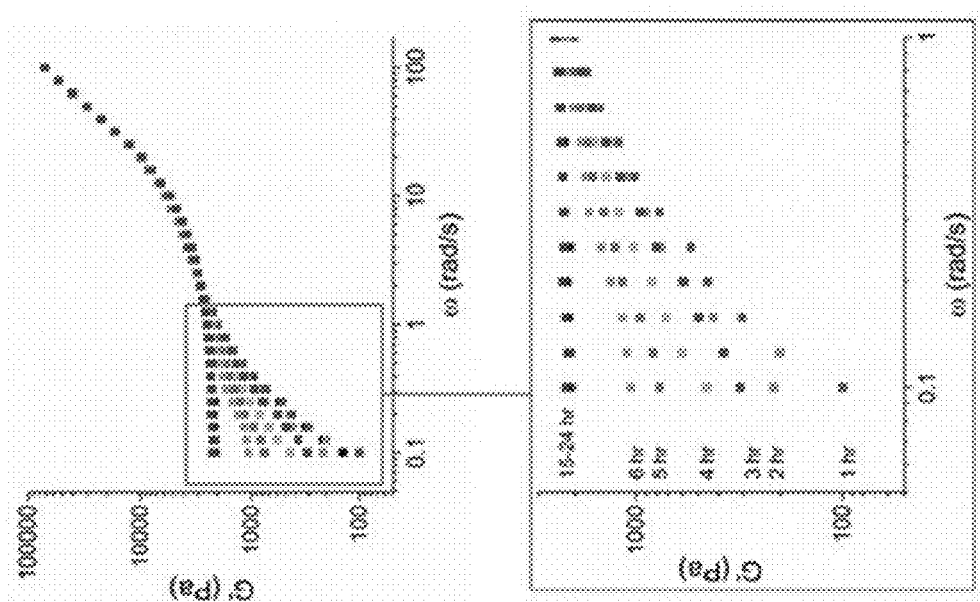

In order to determine whether the addition of water affected micelle stability, solutions were monitored over a period of 9 weeks. DLS data shows consistency of the SO-anth micelle size distribution over time of both (FIG. 17B). Based on this data, there is little to no aggregation with the only discernible difference between weeks one and nine being a slight narrowing of the distribution data. The stability of the system was also apparent in hydroxyl functional precursor diblock copolymer (FIG. 18), as well as SEC data taken over this nine-week period, showing no evidence of degradation for either SO or SO-anth polymer. (FIG. 19).

Figure 17C:
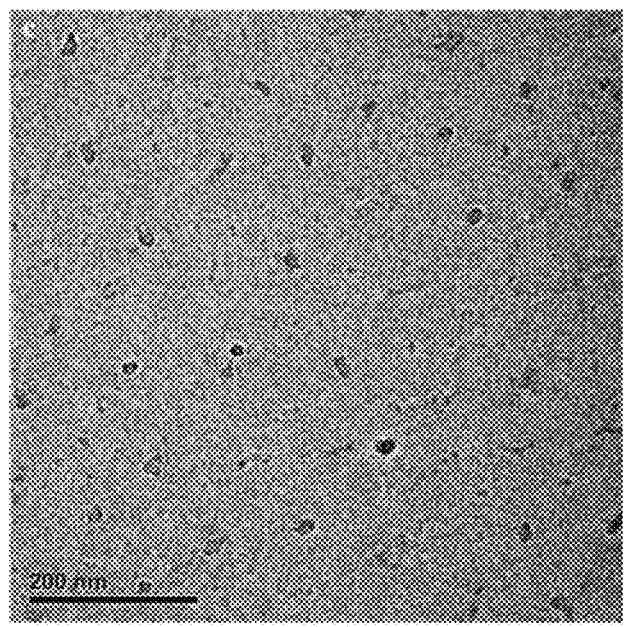

In order to visualize the micelle spacing and confirm uniformity, samples were put in a small-angle x-ray scattering detector and annealed at 120° C. until BCC organization was confirmed. The samples were then slowly lowered about 70° C. to determine whether this organization was retained upon cooling (but before vitrification occurred). BCC geometry was retained (FIG. 16), so the samples were then immediately quenched in order to preserve the structure at this temperature, and then were imaged using cryogenic transmission electron microscopy (cryo-TEM). Cryo-TEM images revealed even dispersal of the micelles, and confirmed the DLS data showing an apparent absence of any apparent micelle aggregates (FIG. 17C).

Example 8

Network Installation Through UV Photocoupling of SO-Anth/Water Solution

Figure 20A:
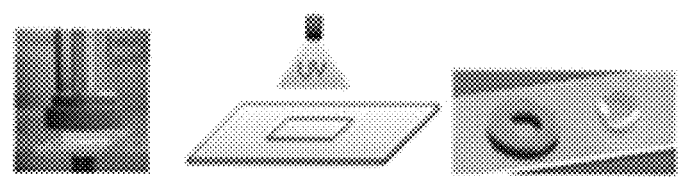
FIGS. 20A-20F depict the effects of UV exposure time on a Q=16 g water/g polymer solution. Curing in a mold (FIG. 20A) produced samples in which exposure time was positively correlated with both installed triblock content based on SEC data (FIG. 20B), and shear elastic modulus at room temperature extracted from frequency sweeps ($\omega$=1 Hz, $\varepsilon$=7%) (FIG. 20C). Samples of $Q_{pre-swell}$ photocured solutions were then swollen to equilibrium in DI water (FIG. 20D). Shear elastic modulus ($\omega$=1 Hz, $\varepsilon$=7%) at equilibrium was also positively correlated with initial swelling ratio ($Q_{pre-swell}$) (FIG. 20E) as well as tensile modulus (FIG. 20F).
Figure 20B:
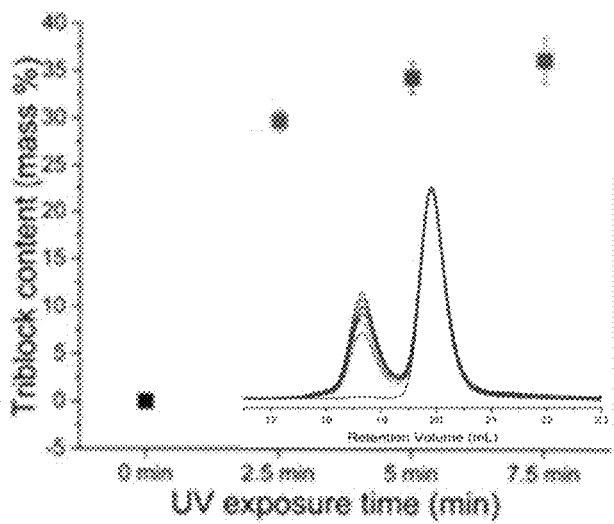
Figure 20C:
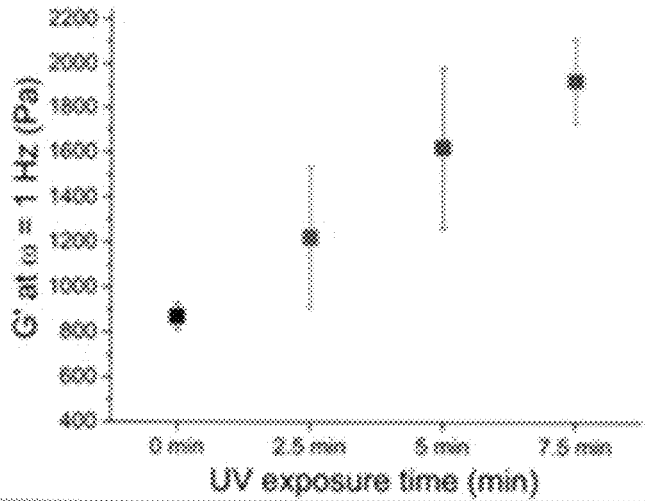
Figures 20D, 20E, 20F:
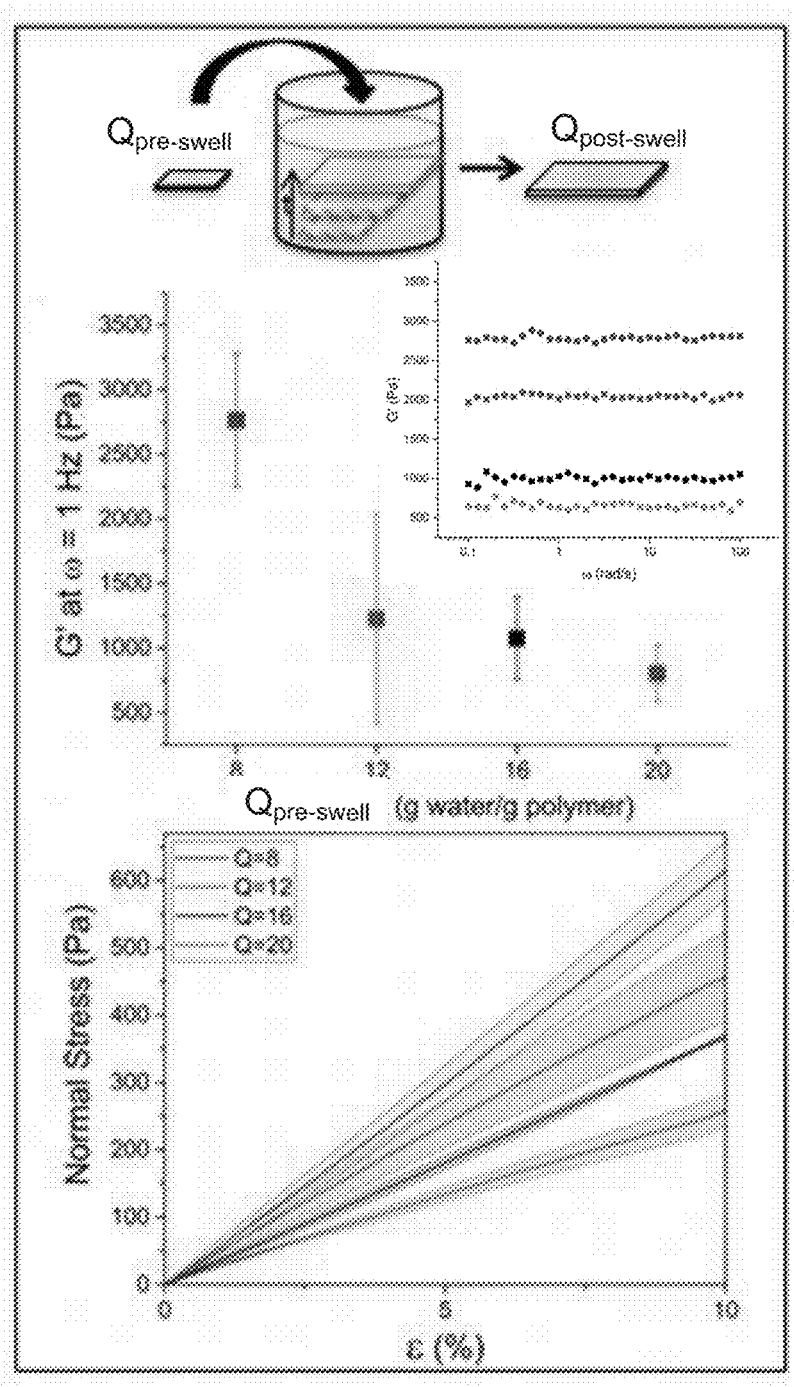

Micelle solutions could then be used as needed for photocoupling into TPE hydrogels. In this study, solutions of Q between 8 and 20 were scooped into both circular and rectangular molds, sandwiched between hydrophobic glass slides, and exposed to light (conditions) for up to 7.5 minutes to form soft hydrogels (FIG. 20A). These gels could then be placed in excess in degassed water to induce further swelling until their equilibrium dimensions were reached. Equilibrium was reached at the point in at which osmotic swelling forces were balanced against the entropic resistance to this swelling, a result of the tethering and entanglement densities of the photocoupled PEO midblocks (FIG. 20D). All mechanical testing was performed in this equilibrium state, after both irradiation and swelling.

First, Q=16 solutions were exposed to UV light for 2.5, 5, and 7.5 min in glass-sandwiched molds, flipping the constructs over their horizontal axis halfway through irradiation time. SEC data showed installed SOS content increasing with increasing exposure time, with most SOS tethering occurring within the first 2.5 minutes (FIG. 20B). After swelling to equilibrium, dynamic frequency sweeps ($\omega$=0.1-100 rad s$^{-1}$) performed on these swollen displayed plateau responses of the elastic modulus for samples of all exposure times (not shown), typical of elastomeric materials. The elastic moduli extracted from these sweeps at 1 rad s$^{-1}$ are positively correlated with UV exposure time, indicating increased modulus with increased SOS triblock copolymer tether installation (FIG. 20C). This additional tethering causes additional entanglements within the network. These entanglements contribute to the increase in modulus of these micelle-based BCP systems. It is important to note that elastic shear modulus values of hydrogels made as a result of solution coupling (G'=0.6-3.3 kPa) are significantly lower than those achieved through melt coupling (about G'=1-100 kPa). Without being bound to any one theory, this observation suggests a major feature of these micellar systems is that the modulus can be further fixed by adjustment of proximity between micelles. The addition of water to the previously dry system caused the micelles to be significantly more widely spaced, therefore reducing overlap/mingling of micellar domains before any tethers were formed. Upon UV-activated tether installation in this less crowded environment, micellar domains did not form as many entanglements as when they were in the dry melt, resulting in less coronal overlap and thus the significantly reduced moduli observed.

To test this theory, solutions of Q=8, 12, 16, and 20 were smeared into glass-sandwiched molds and then exposed to UV for 5 minutes. This experimental design allowed for exploration of various micelle distances as a result of varied solution concentrations, with 8 being theoretically the highest concentration of micelles in water (and closest in proximity), and 20 being the lowest (thus with the most spacing between micelles). Frequency sweeps were performed as before, again showing a plateau-like (elastic) response in G' (FIG. 20E, inset). These yielded moduli (at $\omega$=1 rad s$^{-1}$) negatively correlated with increase in Q (FIG. 20E). That is, the more water per gram polymer in the system, the lower the modulus. This result is consistent with the hypothesis concerning spacing of the micelles upon tethering.

Finally, some preliminary tensile testing was performed. Gels were photocoupled in rectangular molds, swollen to equilibrium, and cut into dog bone shapes. They were then subjected to tensile testing. FIG. 20F shows a positive correlation of tensile modulus with Q, at least up to 10% strain. Past 10% strain, gels were likely to slip from the tensile apparatus due to their extremely low moduli and high elasticity. This data is consistent with the clear trend demonstrated by that of oscillatory shear experiments discussed above.

Example 9

Demonstration of Photoactive Material Capabilities

The mechanical properties of this TPE material can be effectively tuned due to the ability to tether the micellar BCP building blocks it is comprised of at various UV exposure times and concentrations. Their ability to quickly shift from a viscous liquid to a soft solid with an elastic modulus make them ideal for a variety of biomedical applications such as wound healing treatments and tissue repair which require high surface area contact, precise contouring and shape-fixation, and flexibility. Additional uses may include simultaneous drug release given the potential of the highly entangled matrix inherent to the construct to encapsulate and control release rates of small molecules.

These applications as well as others benefit from conformal shaping of the material and fast curing times. The versatility of the material to achieve such specialized shaping as well as boast the ability to be directedly patterned to achieve desired shapes is demonstrated in FIG. 21. FIGS. 21A and 21C depict polymer solutions on top of which a mask was laid, and UV irradiation was applied. The exposed portions of the solution were tethered, while the areas masked remained with untethered micelles that were able to be removed as a solution, revealing the shapes pictured. FIG. 21B demonstrates the capability of this material to fluoresce under UV due to the natural fluorescence of undimerized anthracene. Dry SO-anth is shown to fluoresce, in contrast to the diblock copolymer to the left of it which contains no untethered anthracene. FIGS. 21D and 21E show hydrogels that are a result of UV-curing solutions in a mold, in which they are shown to be solid-like TPE hydrogels which have well-defined edges and retain the shapes of the molds they were photocured in.

Experimental for Examples 5-9

Materials

Styrene (99%, 50 ppm p-tert-butylcatechol inhibitor, Aldrich) was purified by static vacuum (15-30 mTorr) distillations from di-n-butylmagnesium (1.0 M in heptane, Aldrich) at 40° C. Ethylene oxide (99.5+%, compressed gas, Aldrich) was purified by successive distillations from di-n-butylmagnesium (1.0 M in heptane, Aldrich) at 3° C. sec-butyllithium (1.3 M in cyclohexane/hexane, Fisher) was used as received. Potassium naphthalenide solution was prepared according to Guo, C.; Bailey, T. S. Highly distensible nanostructured elastic hydrogels from AB diblock and ABA triblock copolymer melt blends. *Soft Matter* 2010, 6, (19), 4807-4818 (the disclosures of which are incorporated in their entirety). 9-(chloromethyl)anthracene (98%, Aldrich) and $\alpha,\alpha$-dibromo-p-xylene (97%, Aldrich) were dried under high vacuum for several hours prior to use. Tetrahydrofuran (THF) was degassed by sparging with argon (10 psi) for a period of 45 minutes and then purified over two molecular sieve columns of neutral alumina (Glass Contour, Inc.). Cyclohexane (CHX) was degassed with argon and purified through a column of neutral alumina followed by a column of Q5 copper (II) oxide catalyst (Glass Contour, Inc.). Hydrogels were swollen using DI water of 18.2 MΩ resistivity (Evoqua/U.S. Filter Service Deionization). Other common chemicals and solvents were used as received unless otherwise stated. Ultra-high purity argon (99.998% Airgas) was passed through a column of 5 Å molecular sieves with drierite (Agilent) and oxygen absorbing purifier column (Matheson Tri-gas). Glassware and polymerization reactors were flamed under vacuum and backfilled with argon (3×).

Measurements

NMR and GPC: $^1$H NMR spectra were recorded at room temperature on a Varian Inova 400 MHz spectrometer with a d1 pulse delay of 20 s to ensure complete relaxation of end-groups. Spectra were referenced to the residual protio solvent, $CHCl_3$. Size exclusion chromatography (SEC) spectra were collected on a Viscotek GPC-Max chromatography system outfitted with three 7.5×340 mm Polypore™ (Polymer Laboratories) columns in series, a Viscotek differential refractive index (RI) detector, and an Alltech column oven (mobile phase DMF, 40° C., 1 mL min$^{-1}$).

SAXS: Small Angle X-ray Scattering (SAXS) data were collected on a Rigaku S-Max 3000 High Brilliance three pinhole SAXS system outfitted with a MicroMax-007HFM rotating anode (CuKα), Confocal Max-Flux™ Optic, Gabriel multiwire area detector, and a Linkam thermal stage. Dry polymer samples were sandwiched between kapton windows (0.05-0.5 mm thick×10 mm diameter). Scan times were typically on the order of 3600 s.

Rheology: Rheological melt experiments were run on a TA Instruments Advanced Rheometric Expansion System (ARES) rheometer. Dynamic temperature ramp tests were performed on dry polymer disks while heating and cooling at 1° C. min$^{-1}$ at angular frequency of 1 rad s$^{-1}$ and a strain of 7% (within the linear viscoelastic regime, determined by dynamic strain sweep experiments for each copolymer). Rheological frequency sweeps ($\omega$=0.1-100 rad s$^{-1}$, $\epsilon$=7%, $\dot{\epsilon}$=2% s$^{-1}$) performed on micelle solutions and swollen hydrogels were run at room temperature using a lower tool "cup bath" base and an 8 mm stainless steel upper parallel plate. Non-photocoupled solutions were placed in a small mass upon the center of the base, and photocoupled and swollen hydrogels were blotted and placed in the center of the base. For both samples, a constant force of approximately 5-10% compression was applied before any testing in order to insure sufficient contact and prevent slip.

Determining change in swelling ratio: Solutions of particular water to polymer ratio, or swelling ratio Q ($Q_{pre-swell}$) were photocoupled in rectangular mold to attain solid-like hydrogel properties. They were they swollen to equilibrium in DI water, achieving a new Q ($Q_{post-swell}$). These two swollen states are compared in the paper, and found through measurement of pre- and post-swell dimensions using a caliper to then determine the pre- and post-swell volumes. In this way, the increase in volume is attributed to water imbibed after photocuring and placement in water. Summing this increase in mass with the mass of water initially in the solution, a $Q_{post-swell}$ can be determined.

DLS: Dynamic light scattering measurements were performed using a ZEN3600 Zetasizer Nano particle analyzer. Measurements were taken on the polymer/water solutions diluted to Q=1000, and performed at 25° C., 173° detector angle, and a 4 mW 633 nm laser. All reported particle sizes and PDIs are based on the Z-averaged diameter determined by Zetasizer DLS measurement software.

Synthesis of PS-PEO (SO) and PS-PEO-PS (SOS)

Hydroxyl terminal polystyrene-b-poly(ethylene oxide) (PS-PEO, SO) was synthesized according to a previously reported procedure[26] using two-step anionic polymerization of styrene and ethylene oxide monomer. In brief, step one involved the synthesis of a hydroxyl-terminal polystyrene macroinitator ($M_{n,PS}$=8,064 g mol$^{-1}$, $M_{w,PS}/M_{n,PS}$=1.05, SEC (polystyrene standards)), from which the final SO-OH diblock copolymer was produced. The volume fraction of the PS block in the final diblock copolymer was determined to be 0.12 (using nominal densities at 140° C.) with an overall $M_n$=73800 g mol$^{-1}$ ($M_{w,SO}/M_{n,SO}$=1.04. SEC (polystyrene standards)) calculated using the measured $M_{n,PS}$ and the relative $^1$H NMR integrations. The synthesis of triblock PS-PEO-PS for the pre-blended samples was accomplished via coupling using α,α-dibromo-p-xylene (1 equiv of PS-PEO: 0.5 equiv of α,α-dibromo-p-xylene). In general coupling reactions using α,α-dibromo-p-xylene yield coupling efficiencies in the 70-90 mol % range, with the balance material being uncoupled SO-OH diblock copolymer.

Synthesis of PS-PEO-Anthracene (SO-Anth)→nh2-207

PS-PEO (1.16 g, 0.017 mmol) was dissolved in 100 mL dry THF. The solution was slowly titrated with potassium naphthalenide such that the solution remained light green for at least 20 min. A large excess of 9-(chloromethyl)anthracene (0.113 g, 0.5 mmol, ~15× excess) was then immediately added to the PS-PEO alkoxide solution under a slight positive pressure of argon at room temperature. The solution was allowed to stir overnight under argon. The anthracene terminated block copolymer product was precipitated from 25° C. pentane (1 L) twice. Filtration and drying in vacuo (25° C., ~24 h) gave the block copolymer as an off-white powder. Yield=0.96 g (83%). SEC (polystyrene standards): $M_w/M_n$=1.04. $^1$H NMR (400 MHz, $CDCl_3$, δ): 8.4-8.5 (m, anthracene $H_1$, $H_8$ and $H_{10}$), 7.9-8.0 (d, anthracene $H_4$ and $H_5$), 7.4-7.6 (m, anthracene $H_2$, $H_3$, $H_6$ and $H_7$), 6.2-7.2 (b, —$CH_2$—C(R)H—$C_6H_5$), 5.5 (s, —O—$CH_2$-anthracene), 3.4-3.8 (b, —$CH_2$—$CH_2$—O—), 1.1-2.3 (b, —$CH_2$—C(R)H—$C_6H_5$), 0.8-0.9 (b, $CH_3$—$CH_2$—C(R)H—$CH_3$), 0.5-0.7 (b, $CH_3$—$CH_2$—C(R)H—$CH_3$). See FIG. 13 for clarification of anthracene proton assignments. Relative integrations of anthracene to initiator protons suggest a quantitative addition within $^1$H NMR integration error (~5%).

Making Micelle Solutions

SO-anth was pressed between Teflon sheets at 120° C. for 5 mib, using a mold to prevent spreading of the material during compression. For annealing studies, this pressed material (considered to annealed for 0 time) was then further annealed at 120° C. in either nitrogen (using the rheometer) or in vacuum (in the SAXS) for a range of times. Solutions of SO-anth polymer were pressed without annealing, and combined in specific quantities with degassed DI water. These solutions are used throughout the study in varying concentrations depending on the application, and the relative amounts of water and polymer used are quantified by the swelling ratio Q (g water per g polymer) which range from Q=8 to Q=1000. Containing vials of just-made solutions are topped off with argon gas and left to sit for 24-72 h (depending on their Q) to allow the polymer to soften and mix with the water, and subsequently vortexed for 10 seconds and allowed to settle. Solutions were used as soon as they appeared well-mixed with no visible solid suspensions. Solutions of equal concentration were subjected to identical dissolution procedure times for consistency between solution batches.

Making Micelle Solutions

Molds were temporarily adhered to a hydrophobic glass slide using double-sided tape. Sample solutions were then scooped into molds using a spatula, and then sandwiched using a second treated glass slide also adhered with the tape to prevent movement of the setup. A TA Instruments ARES quartz parallel plate with reflecting mirror tool was positioned approximately 1-2 mm above the surface of the top glass slide. A Hamamatsu Lightning Cure LC8 UV spot cure system using a 200-Watt mercury-Xenon lamp, Asahi Spectra Co high transmission Band pass 365 nm filter, synthetic silica light guide and short focal point condenser lens were used in conjunction. The light guide was positioned approximately 1 cm from the quartz reflecting mirror. The intensity at the surface of the sample was 28-38 mW cm$^{-2}$ (measured in the range of 200-600 nm with an Omnicure R2000 Radiometer). Samples were exposed to UV 365 nm filtered light for 2.5-7.5 minutes and flipped over halfway through the exposure time.

All publications and patent applications cited in this specification are herein incorporated by reference as if each individual publication or patent application were specifically, and individually, indicated to be incorporated by reference.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for preparing a block copolymer hydrogel, comprising:
    heating a dry blend comprising poly(styrene)-b-poly(ethylene oxide) diblock copolymer in which the coronal chain end has been functionalized with photo-dimerizable anthracene groups (SO-anth) to form an SO-anth melt;
    exposing the SO-anth melt to ultraviolet light (UV light) wherein, when exposed to UV light, the components of the SO-anth melt consisting essentially of SO-anth dimerize; and
    contacting the UV exposed SO-anth melt with a liquid medium to form a block copolymer hydrogel,
    the block copolymer hydrogel having a fatigue resistance to at least 500,000 compression cycles.

2. The method of claim 1, further comprising allowing the SO-anth melt to attain ambient temperature before contacting with liquid medium.

3. The method of claim 1, wherein the dry blend is heated to 150° C. and then cooled to a temperature of about 70° C. to about 100° C.

4. The method of claim 1, wherein the SO-anth melt is exposed to UV light from about 1 to about 25 minutes.

5. The method of claim 1, wherein the SO-anth glass is exposed to UV light having a wavelength of about 320-380 nm.

6. The method of claim 1, wherein the block copolymer hydrogel has a liquid medium concentration between about 32:1 and 2:1 liquid medium/SO-anth by weight.

7. The method of claim 1, wherein the block copolymer hydrogel has a liquid medium concentration between about 16:1 and about 4:1 liquid medium/SO-anth by weight.

8. The method of claim 1, wherein the liquid medium is selected from an aqueous medium, a room-temperature ionic liquid (RTIL), a dialkylcarbonate, an alkylenecarbonate, or combinations thereof.

9. The method of claim 1, further comprising hydrogenating the polystyrene fully or partially.

10. The method of claim 1, wherein the compression cycles operate with at least 12% compression at a frequency of about 1 Hz.

11. The method of claim 10, wherein the compression cycles operate with at least 50% compression at least every eleventh cycle.

12. The method of claim 1, wherein the fatigue resistance is characterized by a modulus recoverable to at least 80% of its value before the compression cycles were run.

13. The method of claim 1, wherein the fatigue resistance is characterized by a modulus recoverable to at least 92% of its value before the compression cycles were run.

14. A method for preparing a block copolymer hydrogel, comprising:
    heating a dry blend comprising poly(styrene)-b-poly(ethylene oxide) diblock copolymer in which the coronal chain end has been functionalized with photo-dimerizable anthracene groups (SO-anth) to form an SO-anth melt;
    allowing the SO-anth melt to attain ambient temperature to form an SO-anth glass;
    adding a liquid medium to the SO-anth diblock glass to form a SO-anth diblock solution; and
    exposing the SO-anth diblock solution to ultraviolet light (UV light), wherein when exposed to UV light, the components of the SO-anth melt consisting essentially of SO-anth dimerize.

15. The method of claim 14, further comprising contacting the SO-anth diblock solution with the liquid medium after exposure to UV light.

16. The method of claim 14, further comprising contacting the SO-anth diblock solution with a second liquid medium after exposure to UV light.

17. The method of claim 14, further comprising placing the SO-anth diblock solution in a mold.

18. The method of claim 14, wherein the SO-anth diblock solution is exposed to UV light from about 1 to about 25 minutes.

19. The method of claim 14, wherein the SO-anth diblock solution is exposed to UV light having a wavelength of about 320-380 nm.

20. The method of claim 14, wherein the block copolymer hydrogel has a liquid medium concentration between about 32:1 and 2:1 liquid medium/SO-anth by weight.

21. The method of claim 14, wherein the block copolymer hydrogel has a liquid medium concentration between about 16:1 and about 4:1 liquid medium/SO-anth by weight.

22. The method of claim 14, wherein the liquid medium is selected from an aqueous medium, a room-temperature ionic liquid (RTIL), a dialkylcarbonate, an alkylenecarbonate, or combinations thereof.

23. The method of claim 14, further comprising hydrogenating the polystyrene fully or partially.

* * * * *